(12) United States Patent
Watanabe et al.

(10) Patent No.: US 11,436,776 B2
(45) Date of Patent: Sep. 6, 2022

(54) INFORMATION PROCESSING APPARATUS AND CONTROL METHOD THEREOF

(71) Applicant: CANON KABUSHIKI KAISHA, Tokyo (JP)

(72) Inventors: Kazuhiro Watanabe, Tokyo (JP); Yuko Hokari, Tokyo (JP); Akane Sakamoto, Tokyo (JP); Takeshi Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/807,482

(22) Filed: Mar. 3, 2020

(65) Prior Publication Data

US 2020/0294295 A1 Sep. 17, 2020

(30) Foreign Application Priority Data

Mar. 15, 2019 (JP) .............................. JP2019-048668
Mar. 19, 2019 (JP) .............................. JP2019-051380

(51) Int. Cl.
| | |
|---|---|
| *G06T 11/60* | (2006.01) |
| *G06T 11/40* | (2006.01) |
| *G06F 16/532* | (2019.01) |
| *G06F 3/0488* | (2022.01) |
| *G06F 3/04845* | (2022.01) |

(52) U.S. Cl.
CPC ............ *G06T 11/60* (2013.01); *G06F 3/0488* (2013.01); *G06F 3/04845* (2013.01); *G06F 16/532* (2019.01); *G06T 11/40* (2013.01)

(58) Field of Classification Search
CPC ..... G06T 11/60; G06T 11/40; G06T 2200/24; G06F 16/532; G06F 3/0488; G06F 3/04845; G06F 3/0483; G06F 16/40
See application file for complete search history.

(56) References Cited

U.S. PATENT DOCUMENTS

| | | | | |
|---|---|---|---|---|
| 6,111,586 | A | * 8/2000 | Ikeda ................. | H04N 1/00196 345/619 |
| 8,270,815 | B2 | * 9/2012 | Yen ......................... | G11B 27/11 386/278 |
| 2006/0048069 | A1 | * 3/2006 | Igeta ..................... | G06F 3/0486 715/769 |
| 2006/0053370 | A1 | 3/2006 | Hitaka et al. | |
| 2011/0321084 | A1 | * 12/2011 | Takahashi ............ | H04N 5/2723 725/32 |

(Continued)

FOREIGN PATENT DOCUMENTS

| | | |
|---|---|---|
| JP | 2006-074592 A | 3/2006 |
| JP | 2015-200983 A | 11/2015 |

*Primary Examiner* — YuJang Tswei
(74) *Attorney, Agent, or Firm* — Venable LLP

(57) ABSTRACT

An information processing apparatus includes a designation unit configured to designate at least a part of a plurality of frame areas in each of which an image provided on a screen is arrangeable; an acquisition unit configured to acquire a frame area that satisfies a predetermined condition from the designated frame area; a first determination unit configured to automatically determine an image to be arranged in the frame area that satisfies the predetermined condition; and a display control unit configured to arrange and display the determined image in the frame area that satisfies the predetermined condition.

13 Claims, 20 Drawing Sheets

(56) References Cited

U.S. PATENT DOCUMENTS

| | | | | |
|---|---|---|---|---|
| 2013/0004073 A1* | 1/2013 | Yamaji | ............... | H04N 1/00196 |
| | | | | 382/173 |
| 2013/0236093 A1* | 9/2013 | Gatt | .................... | G06F 3/04845 |
| | | | | 382/167 |
| 2015/0294185 A1* | 10/2015 | Cady | ....................... | G06F 16/51 |
| | | | | 382/195 |
| 2015/0363066 A1* | 12/2015 | Lemay | ................ | G06F 3/04817 |
| | | | | 345/173 |
| 2016/0048942 A1* | 2/2016 | Irie | ........................ | G06T 11/60 |
| | | | | 345/619 |
| 2017/0123492 A1* | 5/2017 | Marggraff | .............. | H04N 5/247 |
| 2018/0335921 A1* | 11/2018 | Karunamuni | ......... | G06F 3/0488 |

* cited by examiner

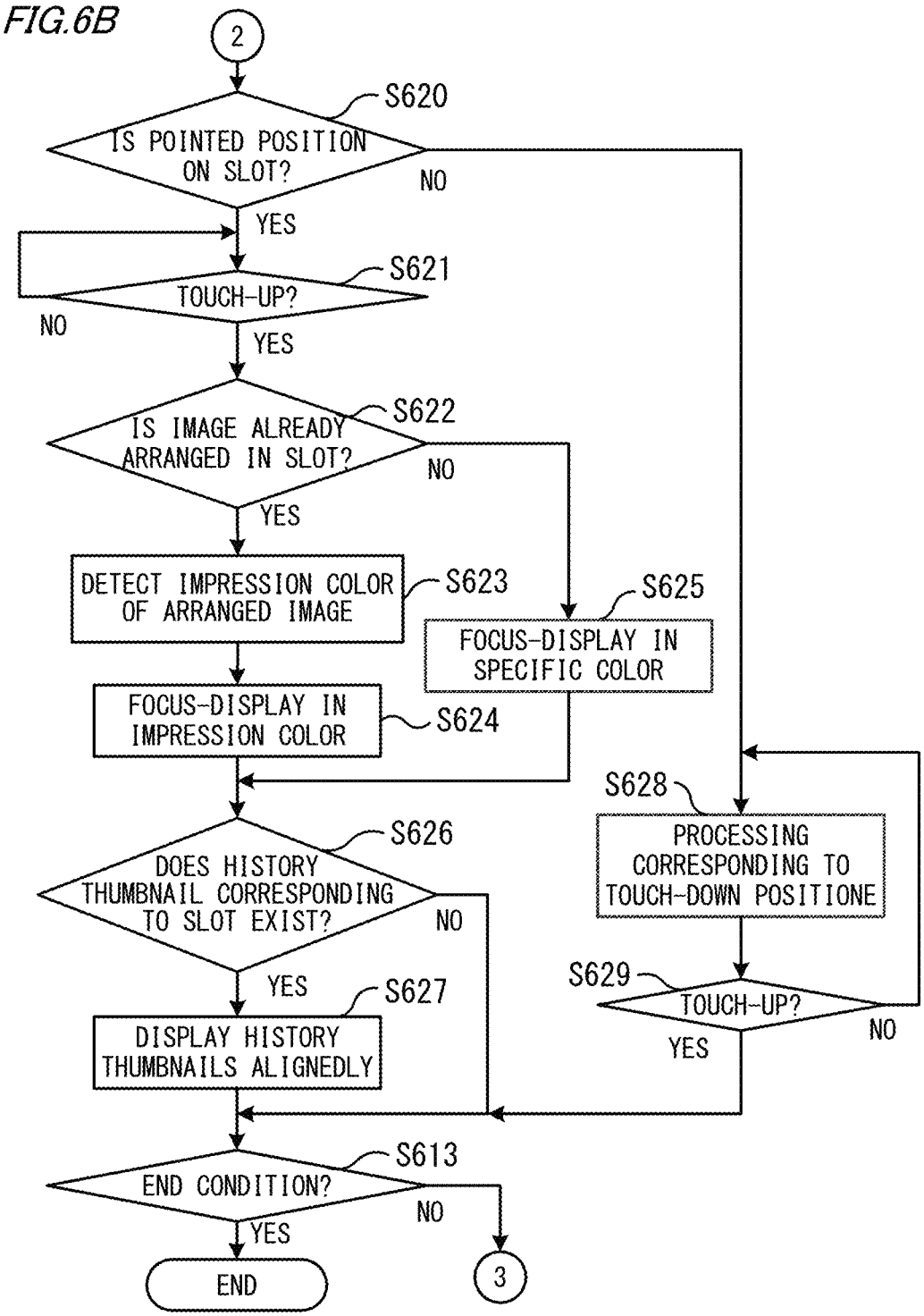

INFORMATION PROCESSING APPARATUS AND CONTROL METHOD THEREOF

BACKGROUND OF THE INVENTION

Field of the Invention

The present invention relates to an information processing apparatus and a control method thereof.

Description of the Related Art

As a method for creating an electronic album on a PC, a technique for automatically arranging images on the electronic album with an optimal layout has conventionally been known (for example, Japanese Patent Application Publication No. 2006-074592).

However, with the conventional technique, even when a user wishes to manually arrange a part of the images to be arranged in an electronic album, the user needs to arrange all the images manually, or alternatively, after arranging all the images automatically, the user needs to manually and separately replace the images that have automatically been arranged with the part of the images that the user wishes to arrange.

In addition, a technique for automatically creating an electronic album by arranging design elements such as photographs and texts has conventionally been known. For example, Japanese Patent Application Publication No. 2015-200983 discloses a technique for allowing a user to easily select desired history information by displaying a history list of setting information used for editing images together with corresponding images in which edit contents are reflected.

However, when the album has a plurality of pages, finding an edit-content history corresponding to the individual page from the history list takes time and efforts. Accordingly, the user finds it difficult to reuse photographs or the like that have been used in the past per album page.

SUMMARY OF THE INVENTION

An object of the present invention is to provide a technique for allowing a user to easily create a desired electronic album by reducing the trouble of operation.

The present invention in one aspect provides an information processing apparatus includes a designation unit configured to designate at least a part of a plurality of frame areas in each of which an image provided on a screen is arrangeable; an acquisition unit configured to acquire a frame area that satisfies a predetermined condition from the designated frame area; a first determination unit configured to automatically determine an image to be arranged in the frame area that satisfies the predetermined condition; and a display control unit configured to arrange and display the determined image in the frame area that satisfies the predetermined condition.

The present invention in one aspect provides a control method of an information processing apparatus, includes a reception step of receiving designation of at least a part of a plurality of frame areas in each of which an image provided on a screen is arrangeable; an acquisition step of acquiring a frame area that satisfies a predetermined condition from the designated frame area; a first determination step of automatically determining an image to be arranged in the frame area that satisfies the predetermined condition; and a display control step of arranging and displaying the determined image in the frame area that satisfies the predetermined condition.

The present invention in one aspect provides a program that causes a computer to function as the units of the above information processing apparatus. The present invention in one aspect provides a non-transitory computer readable medium that stores the above program.

Further features of the present invention will become apparent from the following description of exemplary embodiments with reference to the attached drawings.

BRIEF DESCRIPTION OF THE DRAWINGS

FIG. 6B is a flowchart illustrating an example of processing for displaying a history thumbnail;

DESCRIPTION OF THE EMBODIMENTS

Embodiment 1

Outline

Hereinafter, an electronic album creating apparatus according to a present embodiment will be described. The electronic album creating apparatus according to the present embodiment is, for example, a personal computer (PC) or the like and performs various kinds of control operations on an electronic album displayed on a screen. The electronic album of the present embodiment is electronic photo album data including image data.

In the electronic album creating apparatus, an electronic album creation application program is installed. The electronic album creation application program provides functions of arranging and displaying images, etc. captured by a digital camera or the like on the screen and storing images and information about layouts of the images as electronic album data. The electronic album creation application program provides functions of manually selecting and arranging images in accordance with user preferences and automatically selecting and arranging images. In addition to images, moving images, audio, etc. can also be added and stored in the electronic album. The electronic album according to the present embodiment has a plurality of pages, and an area in which an image can be arranged is provided on each of the pages in advance. The layout of the frame area may be changeable.

When automatically selecting and arranging images, the electronic album creating apparatus displays the frame areas laid out in a rectangular area representing the individual page on the screen and receives a user operation for designating a part of the frame areas. Next, the electronic album creating apparatus automatically arranges an image in each of the frame areas that satisfy a predetermined condition among the designated frame areas. The frame area that satisfies a predetermined condition includes, for example, a frame area in which no image is arranged. An overall structure and processing contents of the electronic album creating apparatus according to the present embodiment will be described below.

Overall Configuration

Figure 1A:
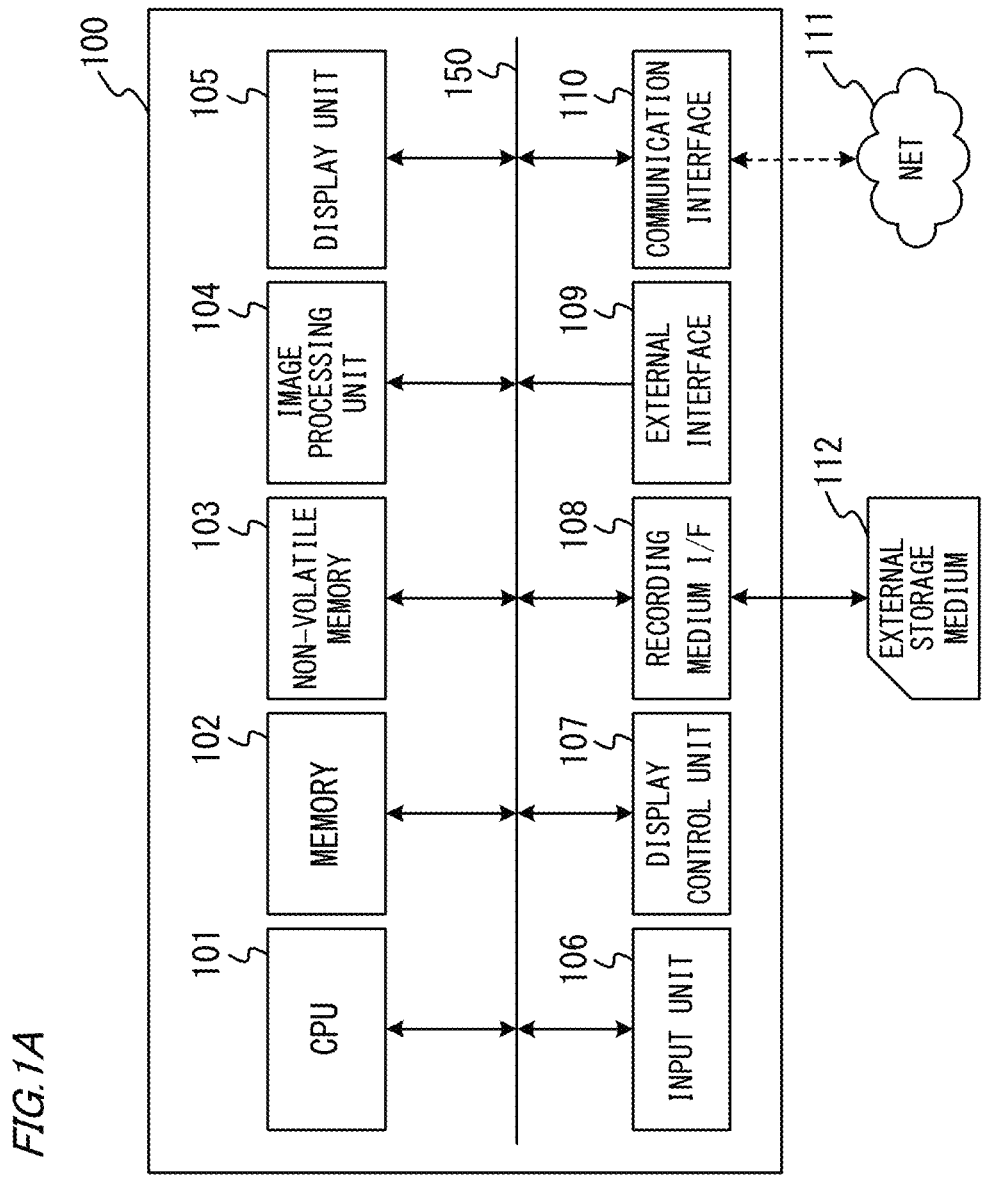
FIG. 1A illustrates an example of a configuration of an electronic album creating apparatus according to Embodiment 1.
Figure 1B:
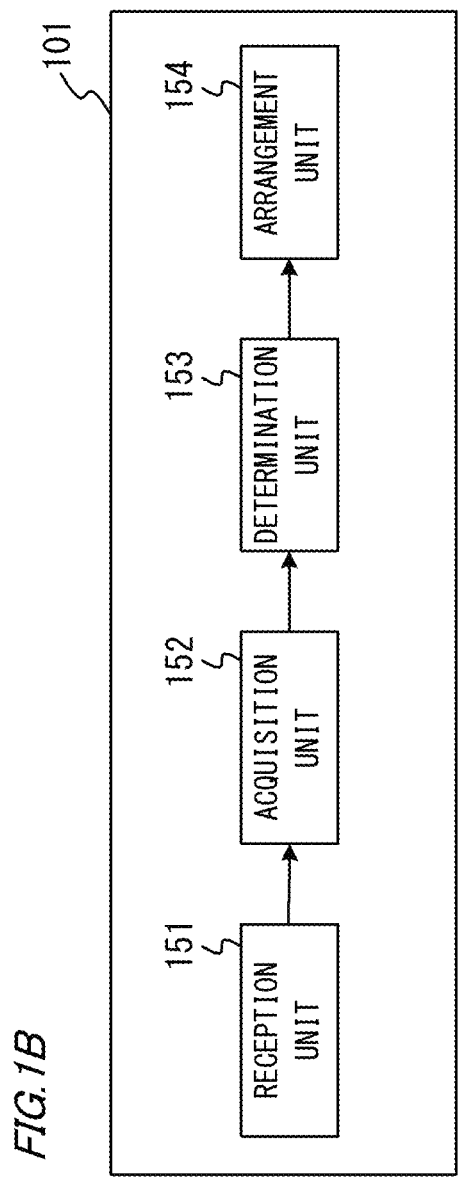
FIG. 1B illustrates a functional block diagram of the electronic album creating apparatus according to Embodiment 1.

FIGS. 1A and 1B each illustrate a configuration of an electronic album creating apparatus 100 according to the present embodiment. FIG. 1A is a configuration diagram of the electronic album creating apparatus 100 according to the present embodiment. For example, the electronic album creating apparatus 100 is an information processing apparatus (electronic apparatus) such as a personal computer (PC) and a tablet terminal. In FIG. 1A, a CPU 101, a memory 102, a non-volatile memory 103, an image processing unit 104, a display unit 105, an input unit 106, a display control unit 107, a recording medium I/F 108, an external I/F 109, a communication I/F 110, etc. are connected to an internal bus 150. The units connected to the internal bus 150 can exchange data via the internal bus 150.

The CPU 101 controls each unit in the electronic album creating apparatus 100, for example, in accordance with a program stored in the non-volatile memory 103 by using the memory 102 as work memory. The memory 102 is, for example, a RAM (a volatile memory using a semiconductor element, etc.). The non-volatile memory 103 stores image data and other data, various programs that cause the CPU 101 to operate, or the like. For example, the non-volatile memory 103 includes a hard disk (HD) and a ROM. Functions and processing performed by the electronic album creating apparatus 100, which will be described below, are realized by the CPU 101 reading and executing the programs stored in the non-volatile memory 103.

The image processing unit 104 performs various kinds of image processing on image data stored in the non-volatile memory 103 and a recording medium (for example, an external storage medium) 112, image data obtained via the external I/F 109 and the communication I/F 110, etc. based on the control by the CPU 101. The image processing performed by the image processing unit 104 includes A/D conversion processing, D/A conversion processing, encoding processing on image data, compression processing, decoding processing, enlargement/reduction processing (resizing), noise reduction processing, and color change processing.

The display unit 105 displays images and a graphical user interface (GUI) screen that constitutes a GUI based on the control by the display control unit 107. The CPU 101 controls each unit in the electronic album creating apparatus 100 to generate a display control signal in accordance with the program, generate a video signal to be displayed on the display unit 105, and output the generated signal on the display unit 105. The electronic album creating apparatus 100 may include an interface for outputting a video signal to be displayed on the display unit 105 and output the video signal to a separate display (television, etc.) from the electronic album creating apparatus 100.

The input unit 106 receives an operation input (input of characters, etc.) performed on an operation unit such as a keyboard, a mouse, a microphone, and a touch panel. For example, the input unit 106 receives various instructions such as inputs of characters and numerals through a keyboard operation by a user. The input unit 106 may receive an instruction to move a cursor displayed on the display unit 105 through a mouse operation by the user and an instruction to select or move an item displayed on the display unit 105. The input unit 106 may receive an audio signal or the like output by the microphone.

The display control unit 107 controls images (including still images and moving images) displayed on the display unit 105 in accordance with a user operation or the like. A recording medium such as a memory card, a CD, or a DVD is attachable to the recording medium I/F 108, and based on the control by the CPU 101, the recording medium I/F 108 performs data reading and writing from and into the recording medium attached thereto. The external I/F 109 is an interface for connecting to an external device through a wired cable or wireless communication to input and output a signal. The communication I/F 110 is an interface for communicating with an external device, the Internet (NET 111), etc. to exchange various kinds of data such as files and commands.

Next, an example of a case where a touch panel (a touch-sensitive surface) is used as the operation unit described above will be described. The touch panel detects contact with the display unit 105. The touch panel and the display unit 105 can integrally be constituted. For example, the touch panel is configured such that light transmittance does not interfere with the display of the display unit 105 and is attached to the upper layer of the display surface of the display unit 105. Next, input coordinates on the touch panel and display coordinates on the display unit 105 are made to correspond to each other. In this way, a graphical user interface (GUI) that provides a feeling as if the user could directly operate the screen displayed on the display unit 105 can be constituted. The CPU 101 can detect the following operations and states given to the touch panel.

An operation in which a finger or a pen that has not been in contact with the touch panel newly touches the touch panel, namely, a start of a touch (hereinafter, referred to as "Touch-Down").

A state in which the finger or the pen is touching the touch panel (hereinafter, referred to as "Touch-On").

An operation in which the finger or the pen moves while touching the touch panel (hereinafter, referred to as "Touch-Move").

An operation in which the finger or the pen that has been touching the touch panel is released, namely, an end of the touch (hereinafter, referred to as "Touch-Up").

A state in which nothing is touching the touch panel (hereinafter, referred to as "Touch-Off").

When a Touch-Down is detected, a Touch-On is also detected at the same time. After the Touch-Down, unless a Touch-Up is detected, normally, the Touch-On is continuously detected. A Touch-Move is detected while the Touch-On is being detected. Even when the Touch-On is detected, if a touch position is not moved, the Touch-Move is not detected. After a Touch-Up of all the fingers or the pen that have been touching the touch panel is detected, a state of a Touch-Off starts.

The CPU 101 is notified of these operations and states as well as position coordinates at which the finger or the pen has touched the touch panel via the internal bus, and the CPU 101 determines the operation that has been performed on the touch panel on based on the information notified. In terms of a Touch-Move, the CPU 101 can determine the direction of movement of the finger or the pen on the touch panel for each horizontal component and vertical component on the touch panel based on a change in the position coordinates. In addition, when a Touch-Down is performed, and then a Touch-Up is performed after a certain amount of Touch-Move on the touch panel, the CPU 101 determines that a stroke has been drawn.

A flick is an operation in which a finger quickly moves for a certain distance while touching the touch panel and then is released. In other words, the flick is an operation in which the user quickly traces the touch panel with the finger with a flicking action. If a Touch-Move performed for a predetermined distance or more at a predetermined speed or more is detected and this Touch-Move is followed by a Touch-Up, the CPU 101 determines that the flick has been performed. In addition, if a Touch-Move performed for a predetermined distance or more at less than a predetermined speed is detected, the CPU 101 determines that a drag has been performed.

There are various types of touch panel, such as a resistive film type, an electrostatic capacitive type, a surface acoustic wave type, an infrared ray type, an electromagnetic induction type, an image recognition type, and an optical sensor type. Any of the above types of touch panel may be used. Depending on the type, there is a type in which a touch is detected based on contact with the touch panel, and there is another type in which a touch is detected based on an approach of a finger or a pen to the touch panel. Either type may be applied.

FIG. 1B is a functional block diagram of the electronic album creating apparatus 100 according to the present embodiment. Functions of a reception unit 151, an acquisition unit 152, a determination unit 153, an arrangement unit 154, etc. of the electronic album creating apparatus 100 are provided by the electronic album creating apparatus 100 executing the program stored in the non-volatile memory 103. A part of or all of these functions may be realized by special-purpose logic circuitry such as an ASIC and an FPGA.

The reception unit 151 is a functional unit that receives an operation for designating a part of the frame areas provided in the electronic album. Examples of the frame-area designation method include a method in which the part of the frame areas is designated by "overlapping the frame area on a page of the electronic album with a predetermined area" or by "directly designating the frame area on a page of the electronic album".

"Overlapping the frame area on a page of the electronic album with a predetermined area" indicates that, when a page of the electronic album is movable, the frame area on a page of the electronic album is made to overlap a predetermined area (a candidate-image area) by performing a slide operation, or alternatively, the frame area on the electronic album is made to overlap an area designated by using an operation unit such as a mouse. "Directly designating the frame area on a page of the electronic album" indicates a method in which the frame area on a page of the electronic album is designated by an operation of the operation unit, such as a mouse or a keyboard, or by a touch operation. The present embodiment will be described with an example in which the frame area is designated by overlapping the frame area on a page of the electronic album displayed on the display unit 105 with a predetermined area by performing a slide operation.

The acquisition unit 152 is a functional unit that determines the frame area that satisfies a predetermined condition among the designated frame areas. The present embodiment will be described with an example in which the frame area that satisfies a predetermined condition refers to the frame area in which no image is arranged.

However, the frame area that satisfies a predetermined condition is not limited to the above example. For example, the frame area that satisfies a predetermined condition may refer to the frame area in which an image is arranged. In addition, among the frame areas in which images are arranged, the frame area that satisfies a predetermined condition may refer to the frame area in which the image has been arranged before (or has been arranged after) a predetermined date and time. In addition, among the frame areas in which images are arranged, the frame area that satisfies a predetermined condition may refer to the frame area in which the image has been replaced the predetermined number of times or less (or more). Examples of the predetermined date and time or the predetermined number of times include the date and time (the number of times) specified by the user and the system-specific date and time (number of times) held in association with the electronic album. In addition, among the frame areas in which images are arranged, the frame area that satisfies a predetermined condition may refer to upper several tens of percent of the frame areas obtained when the frame areas are sorted in ascending (or descending) order based on the date and time of the arrangement of the image or the number of times of the replacement of the image. Also, the above conditions may be combined. For example, both of the frame area in which no image is arranged and the frame area in which the image has been replaced before a predetermined date and time, among the frame areas in which images are arranged, may be regarded as the frame area that satisfies the predetermined condition.

The determination unit 153 is a functional unit that determines an image to be arranged in the above frame area that satisfies the predetermined condition. The present embodiment will be described with an example in which an image is randomly determined from the images displayed in the predetermined frame area. However, the image determination method is not particularly limited. For example, an image that satisfies a predetermined condition (an image having a feature amount similar to that of a subject in the image manually arranged on the same page, images having a close photographing date and time, etc.) may be selected.

The arrangement unit 154 is a functional unit that arranges the image determined by the determination unit 153 in the frame area that satisfies the above predetermined condition. Namely, the arrangement unit 154 does not arrange (update) an image in the frame area that does not satisfy the predetermined condition among the designated frame areas described above.

Examples of Image Display

FIGS. 2A to 2E illustrate examples of selection of frame areas and arrangement of images performed by the electronic album creating apparatus 100 of the present embodiment.

Figure 2A:
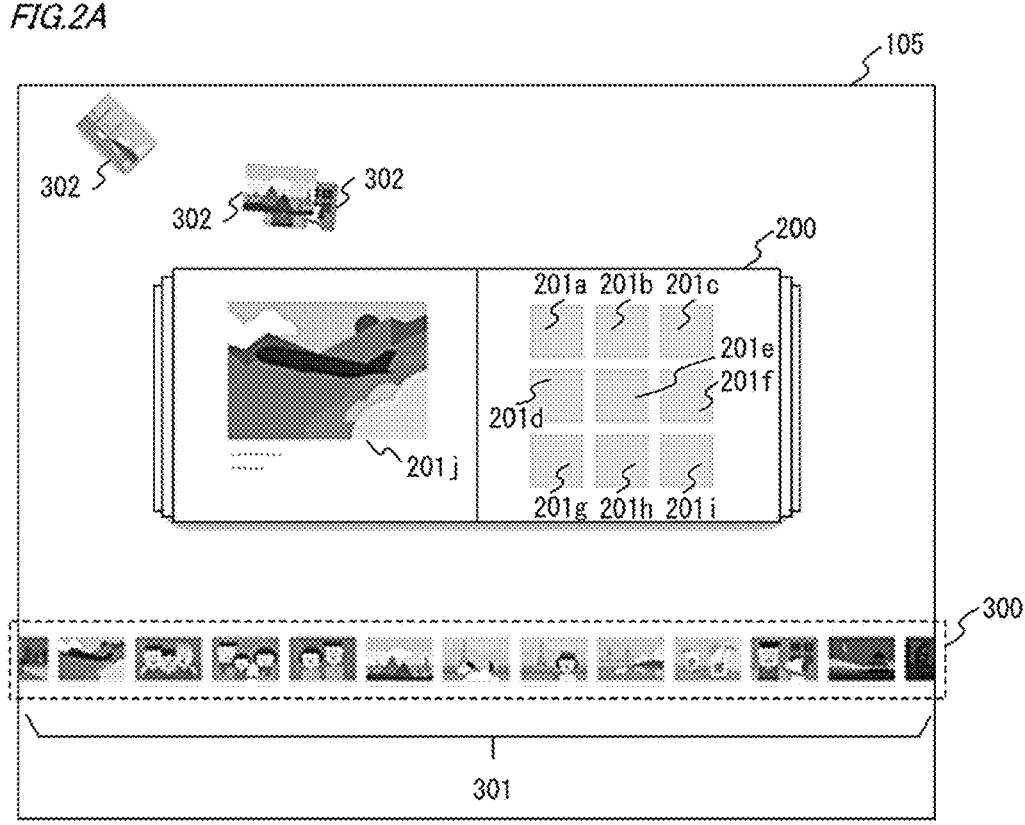
FIG. 2A illustrates an example of a display image according to Embodiment 1.

FIG. 2A illustrates a page 200 of the electronic album displayed on the display unit 105, an image tray 300, etc. In FIG. 2A, pages on the right and left sides (a two-page spread) that form a pair when the electronic album is opened are displayed on the display unit 105. The electronic album includes a plurality of pages and a plurality of areas (for example, frame areas 201a to 201j) in which images are to be arranged are provided on each page. When the frame areas 201a to 201j do not need to be distinguished from each other, the frame areas 201a to 201j are simply referred to as a frame area 201. In FIG. 2A, no images are arranged in the frame areas 201a to 201i, and an image (any of images 301, which will be described below) is arranged in the frame area 201j. The image tray 300 is an area where a part of (or all of) the images 301, which are at least one image to be arranged in the above frame area 201, is (are) displayed (for example, in a thumbnail display form). The image 301 is an image stored in a storage medium inside or outside the electronic album creating apparatus 100. If only a part of the images is displayed in the image tray 300, the user can change the images to be displayed in the image tray 300 by performing a scroll operation or the like to the image tray 300. An image 302 is an image which has originally been provided in the image tray 300 and then moved out of the image tray 300 by a user operation or the like.

Among the plurality of pages included in the electronic album, the pages displayed on the display unit 105 are selected in accordance with a user operation for inputting a page number or a user operation for instructing to switch the page.

In the present embodiment, the user can move/rotate the page 200 of the electronic album by operating the touch panel or the operation unit. In addition, along with the moving or rotating of the page 200, the plurality of frame areas 201 provided thereon are displayed in such a manner that the respective display positions on the screen are collectively moved/rotated. If an image is automatically selected and arranged in the frame area 201, the user moves/rotates the page 200 of the electronic album to overlap the frame area 201 to the vicinity of the image tray 300. In this way, the user designates a target area for this automatic selection and arrangement. If an image is manually selected and arranged in the frame area 201, the user performs a Touch-Down to any of the images 301, and after performing a slide operation, the user performs a Touch-Up on the frame area 201. In this way, the user can arrange the desired image 301 in the desired frame area 201. In addition, by performing a Touch-Up at an area other than the frame area 201, the image 301 may be arranged at the area other than the page 200 of the electronic album and the image tray 300. The image 302 arranged in this way can be used as a candidate for the image to be arranged in the frame area 201. In addition, the image that has been arranged in the frame area 201 or the image 302 can be moved again by performing the above touch operations and can be, for example, returned to the image tray 300. When manually selecting and arranging the image, the user may select and arrange the image by operating the operation unit such as a mouse or a keyboard, other than performing the above touch panel operation.

Figure 2B:
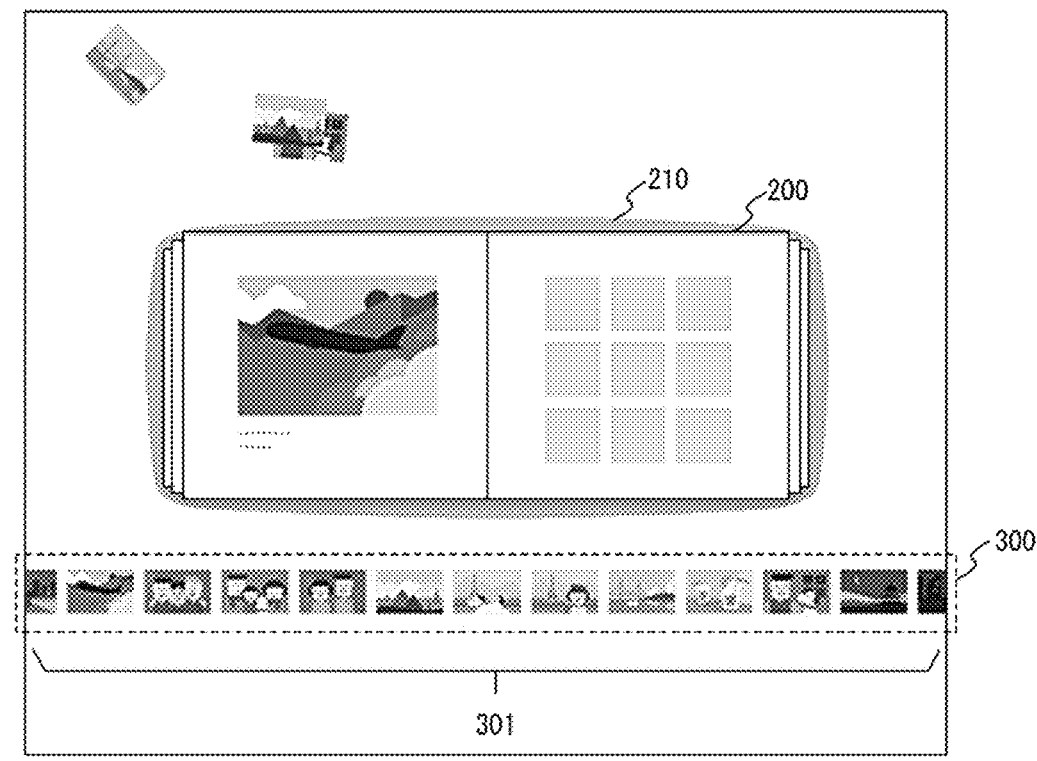
FIG. 2B illustrates an example of a display image according to Embodiment 1.

FIG. 2B illustrates a display example in a case where the user performs a Touch-Down to the right end, which is the end portion of the page 200 of the electronic album. In the present embodiment, to indicate that a Touch-Move operation has started, a frame 210 is displayed around the page 200 of the electronic album.

Figure 2C:
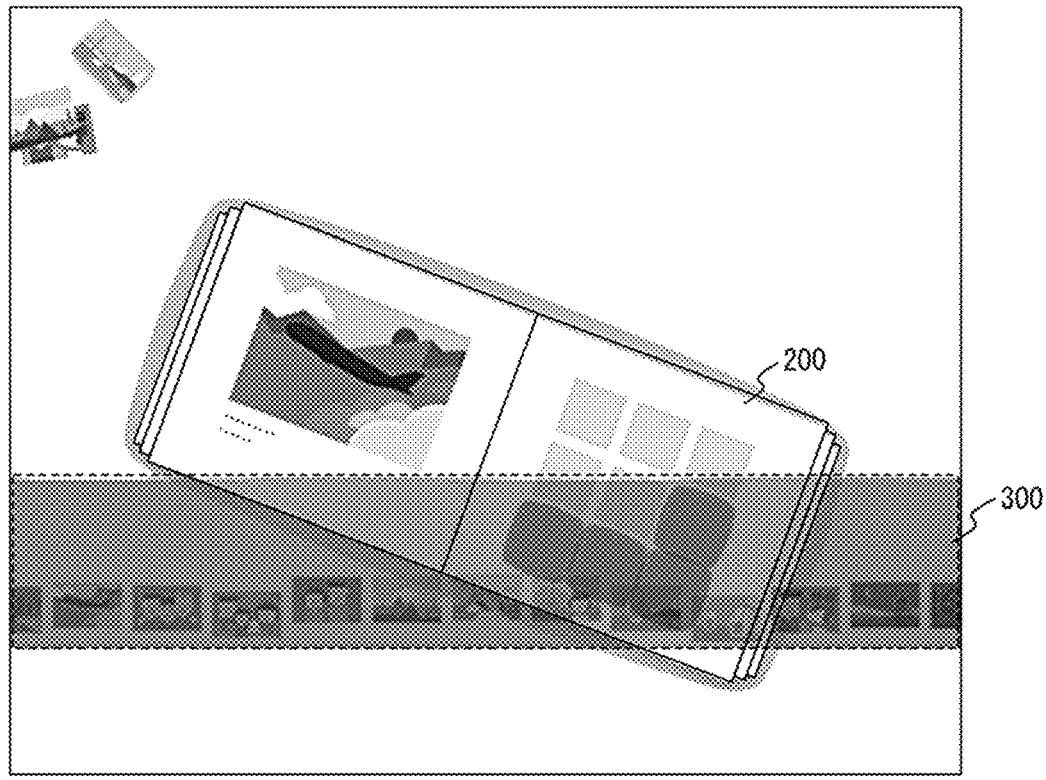
FIG. 2C illustrates an example of a display image according to Embodiment 1.

FIG. 2C illustrates a state in which a part of the page 200 of the electronic album is overlapped with the image tray 300. When the end portion (in FIG. 2C, a part of the right end) of the page 200 of the electronic album reaches (overlaps) the vicinity of the image tray 300, the display area of the image tray 300 expands. Next, the expanded image tray 300 is displayed in such a manner that the expanded image tray 300 overlaps the frame area 201 on the page 200 of the electronic album. At this point, among the frame areas 201 on the page 200 of the electronic album, the electronic album creating apparatus 100 recognizes the area overlapped with the image tray 300 (predetermined area) as a designated area. In the present embodiment, to distinguish the frame area 201 designated by overlapping with the image tray 300 from the other frame area 201, the designated frame area 201 is displayed in a different color from the other frame area 201. The present embodiment will be described with an example in which the electronic album creating apparatus 100 determines that the frame area 201 is "overlapped" when the entire frame area 201 is included in the image tray 300. However, the determination criterion is not particularly limited. For example, the electronic album creating apparatus 100 may determine that the frame area 201 is "overlapped" when a predetermined proportion or more of the entire frame area 201 is included in the image tray 300. In addition, in the present embodiment, a case where the page 200 of the electronic album is tilted to be overlapped with the image tray 300 is described. However, the page 200 of the electronic album may be overlapped with the image tray 300 by moving downward, without tilting.

Figure 2D:
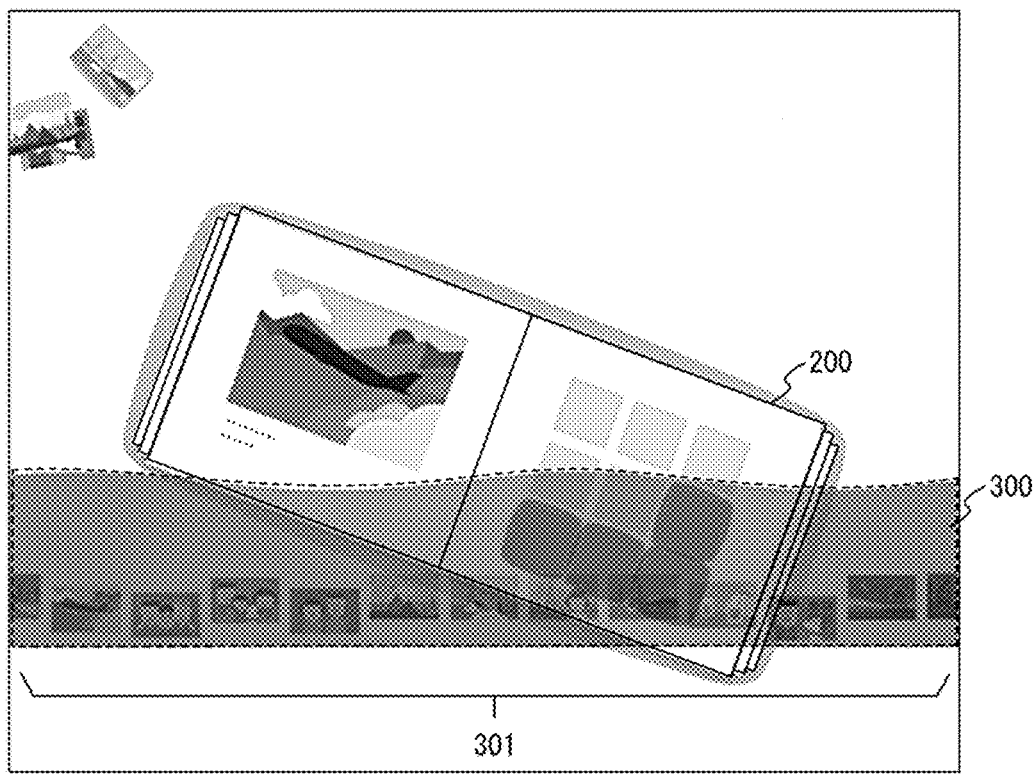
FIG. 2D illustrates an example of a display image according to Embodiment 1.

FIG. 2D illustrates a display example in a case where the user overlaps the page 200 of the electronic album with the image tray 300 and maintains the touch for a while. In the present embodiment, the image tray 300 is displayed in such a manner that the upper edge of the image tray 300 moves like a wave. Also, an animation in which some of the images are popping in the image tray 300 is displayed. This animation indicates to the user that the processing for selecting (determining) an image to be arranged in the frame area 201 is in progress. The electronic album creating apparatus 100 arranges the automatically selected image 301 in the frame area 201 in which no image is arranged yet (the frame area 201 that satisfies the predetermined condition) among the frame areas 201 that are overlapped with the image tray 300 (the frame areas 201 that have been designated).

Figure 2E:
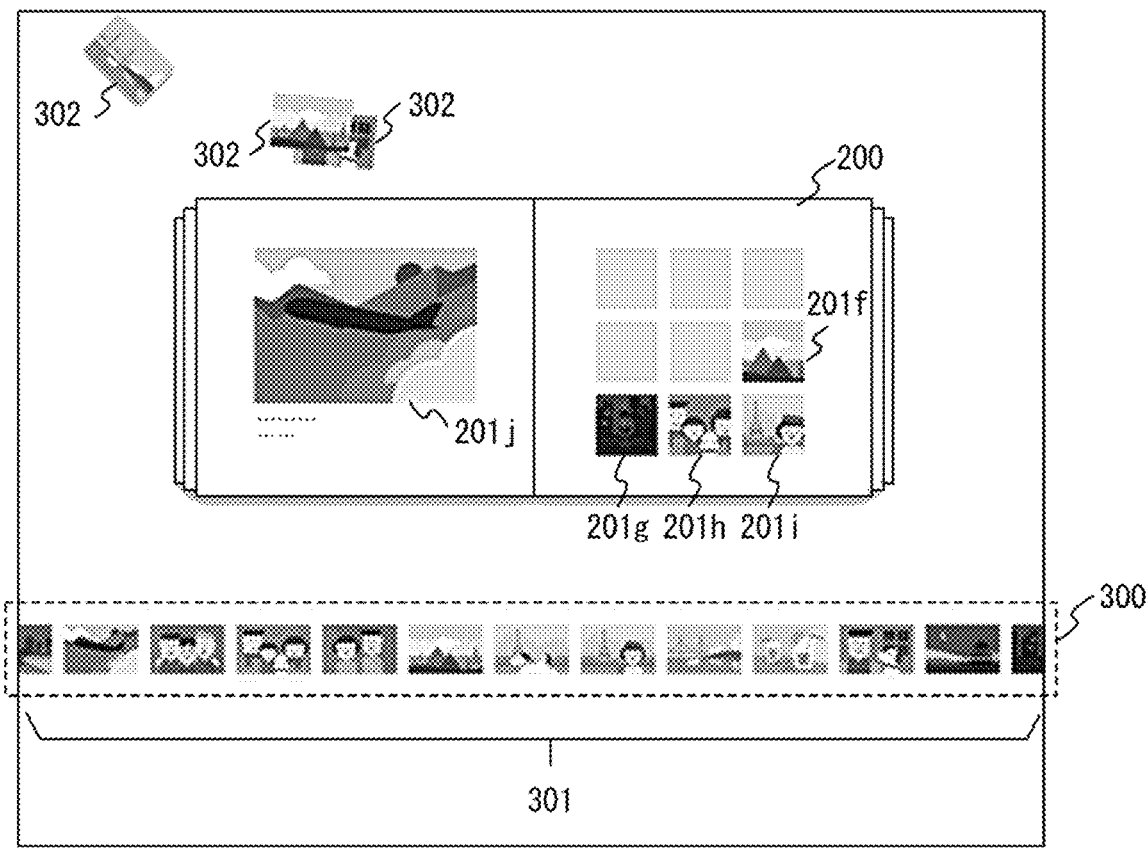
FIG. 2E illustrates an example of a display image according to Embodiment 1.

FIG. 2E illustrates a display example in a case where the user ends the touch to the page 200 of the electronic album and performs a Touch-Up operation. In this case, the page 200 of the electronic album is displayed at the original position. At this point, the image 301 in the image tray 300 is automatically arranged in the frame area 201 that is overlapped with the image tray 300 in FIG. 2C. In this way, the automatically selected image 301 is displayed in the frame area 201 in which no image has been arranged (the frame area 201 that satisfies the predetermined condition) among the frame areas 201 designated by the user. The image that has been moved out of the image tray 300 (for example, the image 302), the image that has already been arranged on the page 200 (for example, an image arranged in the frame area 201*j*) or on the other page of the electronic album may be excluded from the images subject to the automatic selection and arrangement.

Processing Contents

Figure 3A:
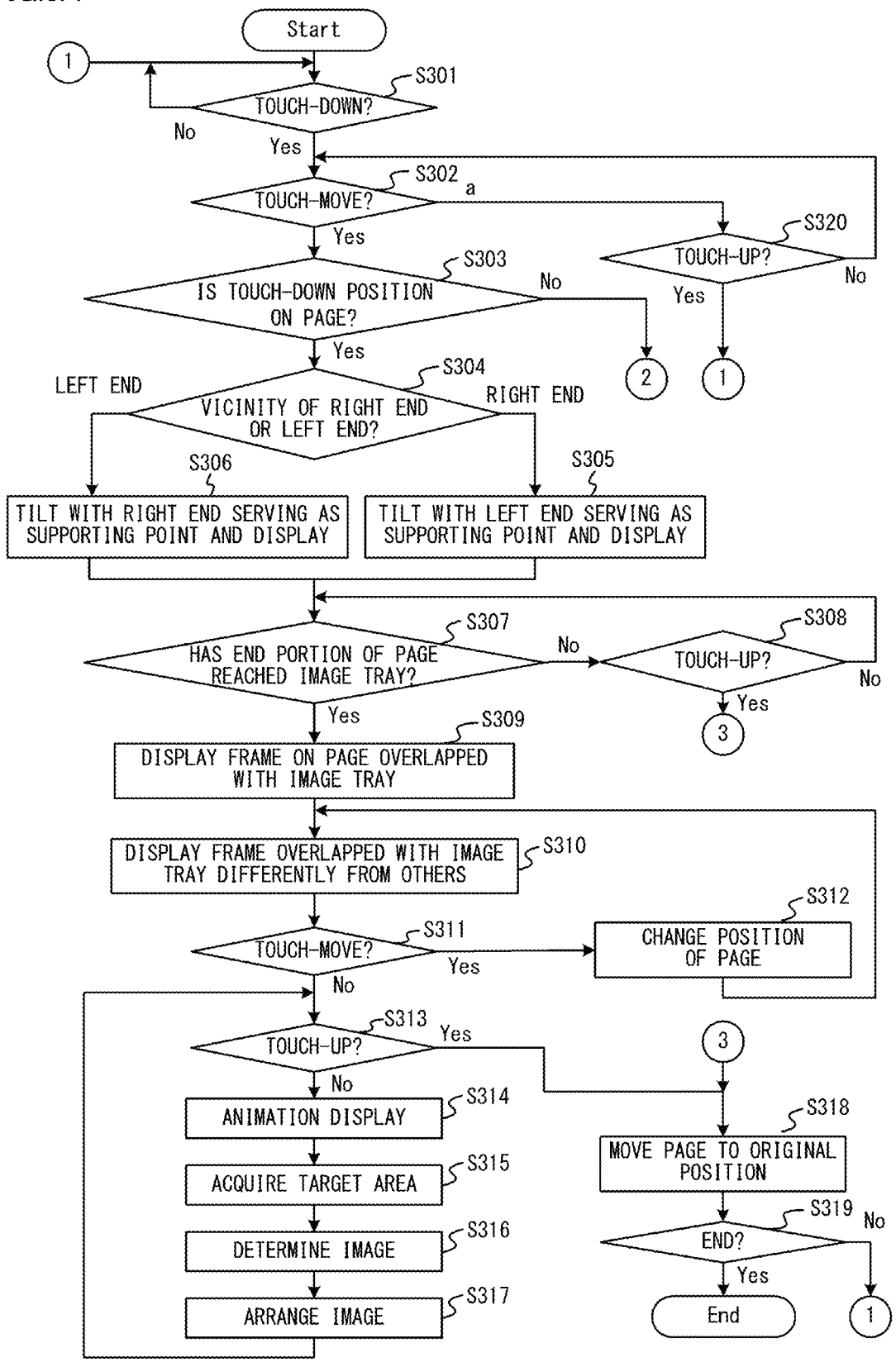
FIG. 3A is a flowchart illustrating an example of processing according to Embodiment 1.
Figure 3B:
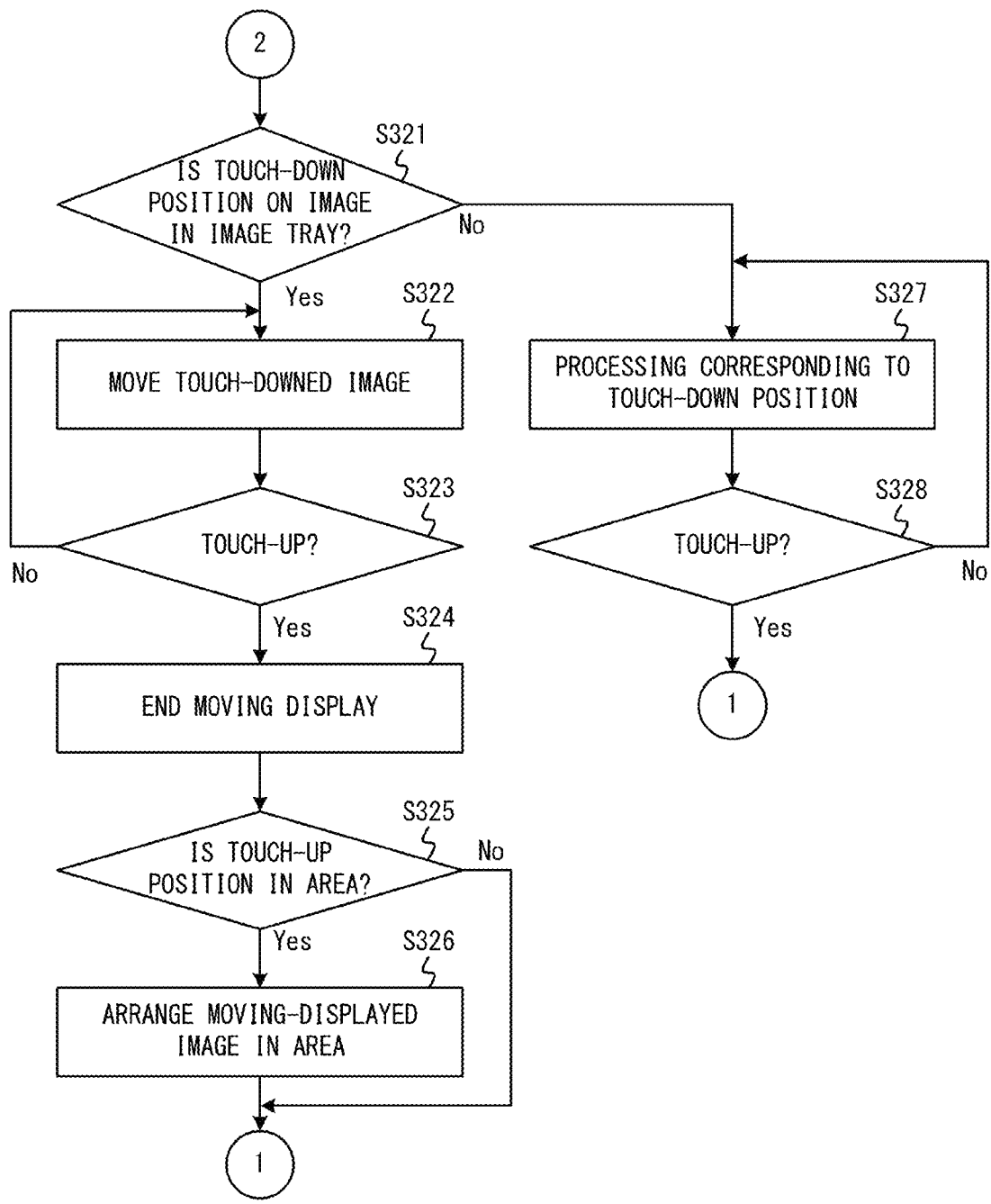
FIG. 3B is a flowchart illustrating an example of the processing according to Embodiment 1.

FIGS. 3A and 3B are flowcharts illustrating processing according to the present embodiment. FIG. 3A illustrates processing in steps S301 to S320, and FIG. 3B illustrates processing in steps S321 to S328.

In S301, the CPU 101 determines whether the user has performed a Touch-Down operation. If the Touch-Down operation has been performed, the processing proceeds to S302, and if not, the determination processing in S301 is repeated.

In S302, the CPU 101 determines whether a moving operation (a Touch-Move operation) of a touch point (a position touched) has been performed. If the moving operation of the touch point has been performed, the processing proceeds to S303, and if not, the processing proceeds to S320. In S320, the CPU 101 determines whether a Touch-Up operation has been performed. If the Touch-Up operation has been performed, the processing proceeds to S301, and if not, the processing proceeds to S302.

In S303, the CPU 101 determines whether a position to which the user has performed the Touch-Down operation is on the page 200 of the electronic album. If the position is on the page 200 of the electronic album, the processing proceeds to step S304, and if not, the processing proceeds to S321.

In S304, the CPU 101 determines whether the position of the touch point is in the vicinity of the right end portion or the left end portion of the page 200 of the electronic album. The vicinity of the right end portion and the vicinity of the left end portion refer to a range within a predetermined distance from the right end portion and a range within a predetermined distance from the left end portion, respectively. If the touch point is in the vicinity of the right end portion, the processing proceeds to S305, and if the touch point is in the vicinity of the left end portion, the processing proceeds to S306. In S305, the CPU 101 displays the page 200 of the electronic album tilted along with the movement of the touch point with the center of the left end portion of the page 200 of the electronic album serving as a supporting point. In S306, the CPU 101 displays the page 200 of the electronic album tilted along with the movement of the touch point with the center of the right end portion of the page 200 of the electronic album serving as a supporting point. While the processing for displaying the page 200 of the electronic album tilted (rotated) has been described in steps S304 to S306, the page 200 of the electronic album may be moved downward without being tilted. In this case, for example, when the CPU 101 determines that the position of the touch point is around the center of the lower end of the page 200 of the electronic album in S304 or when the CPU 101 determines that the Touch-Down operation has been performed by two fingers in S301, the page 200 of the electronic album may be moved downward without being tilted.

In S307, the CPU 101 determines whether the end portion of the page 200 of the electronic album has reached the image tray 300. If the end portion of the page 200 of the electronic album has reached the image tray 300, the processing proceeds to S309, and if not, the processing proceeds to S308. In the present embodiment, when any part of the page 200 of the electronic album is overlapped with the image tray 300, the CPU 101 determines that the end portion has reached the image tray 300. However, the determination method is not particularly limited. For example, the CPU 101 may determine that the end portion has reached the image tray 300 when the upper portion or the central portion of the right end of the page 200 of the electronic album is included inside the image tray 300. In step S308, the CPU 101 determines whether a Touch-Up operation has been performed. If the Touch-Up operation has been performed, the processing proceeds to S318, and if not, the processing proceeds to S307.

In S309, the CPU 101 controls the display such that the area of the image tray 300 expands to overlap the frame area 201 on the page 200 of the electronic album. The reception unit 151 accepts the overlapped frame area 201 as the frame area 201 designated by the user. In S310, the CPU 101 displays the frame area 201 overlapped with the image tray 300 in a different manner from the other frame area 201. For example, the CPU 101 displays the frame area 201 overlapped with the image tray 300 in a color different from that of the frame area 201 not overlapped.

In S311, the CPU 101 determines whether a moving operation (a Touch-Move operation) of a touch point (a position touched) has been performed. If the moving operation of the touch point has been performed, the processing proceeds to S312, and if not, the processing proceeds to S313.

In S312, the CPU 101 changes the position of the page 200 of the electronic album in accordance with the moving operation of the touch point and displays the moved page 200 of the electronic album. Namely, by performing the Touch-Move operation for changing the position where the page 200 of the electronic album is displayed, the user can change the frame area 201 to be overlapped with the image tray 300 among the frame areas 201 on the page 200 of the electronic album. Next, the processing returns to step S310.

In S313, the CPU 101 determines whether a Touch-Up operation has been performed. If the Touch-Up operation has been performed, the processing proceeds to S318, and if not the processing proceeds to S314.

In S314, the CPU 101 displays an animation indicating that the automatic image-arrangement processing is in progress. Specifically, the CPU 101 changes an upper-side line of the image tray 300 from a straight line to a wavy line and displays an animation such that the upper-side line moves like a wave. In addition, the CPU 101 displays an animation such that some of the images in the image tray 300 are moved in random directions in the image tray 300 as if the images were popping.

In S315, the CPU 101 acquires the frame area 201 in which an image is to be automatically arranged. Specifically, the acquisition unit 152 acquires the frame area 201 (also referred to as an arrangement target area) in which no image is arranged from the frame areas 201 that are overlapped with the image tray 300.

In S316, the CPU 101 determines an image to be arranged in the arrangement target area. Specifically, the determination unit 153 randomly determines an image to be arranged in the above arrangement target area from the images 301. In the present embodiment, the number of the images determined by the determination unit 153 is assumed to be the same as the number of the above arrangement target areas. If the number of the images 301 in the image tray 300 is less than the number of the above arrangement target areas, a plurality of the same images may be included in the determined images, or the number of the determined images may remain less than the number of the arrangement target areas.

In S317, the CPU 101 arranges the determined image in the arrangement target area and displays the arranged image. Specifically, the arrangement unit 154 enlarges or reduces the size of the determined image, as needed, for the individual frame area 201 and arranges the determined image in the arrangement target area.

In S318, the CPU 101 moves the page 200 of the electronic album to its original position and displays the moved page 200 of the electronic album. In S319, the CPU 101 determines whether an end condition is satisfied. The end condition is satisfied when the CPU 101 receives an instruction to end the electronic album creating application program or when the CPU 101 receives a predetermined operation such as turning off the power of the electronic album creating apparatus 100. If the end condition is satisfied, the present processing ends, and if not, the processing proceeds to S301.

If the position to which the Touch-Down operation has been performed by the user is not on the page 200 of the electronic album (NO in S303), the CPU 101 determines whether the position to which the Touch-Down operation has been performed is on the image in the image tray 300 in S321. If the position is on the image in the image tray 300, the processing proceeds to S322, and if not, the processing proceeds to S327.

In S322, the CPU 101 causes the image (hereinafter, referred to as the selected image) to which the Touch-Down operation has been performed to follow the touch point and displays the selected image following the touch point. This is to allow the user to easily identify which is the selected image. The method for displaying the selected image is not particularly limited. For example, the selected image following the touch point may be displayed in a semi-transmissive manner. Alternatively, other than the selected image displayed in the image tray 300, a copied selected image following the touch point may be displayed.

In S323, the CPU 101 determines whether a Touch-Up operation has been performed. If the Touch-Up operation has been performed, the processing proceeds to S324, and if not, the processing proceeds to S322. In S324, the CPU 101 ends the moving display (display indicating the state of being moved) of the selected image. These operations correspond to the operation for manually selecting the image and determining the frame area 201 in which the selected image is to be arranged.

In S325, the CPU 101 determines whether a position where the Touch-Up operation has been performed is in the area of the page 200 of the electronic album. If the position is on the page 200 of the electronic album, the processing proceeds to S326, and if not, the processing proceeds to S301. In S326, the CPU 101 arranges the selected image with the moving display in the frame area 201 corresponding to the position where the above Touch-Up operation has been performed and displays the arranged selected image. In addition, the image arranged outside the page 200 of the electronic album is displayed as described above with the image 302, and may be used as a candidate image when the image is manually arranged in the frame area 201.

In S327, the CPU 101 performs processing that corresponds to the position to which the Touch-Down operation has been performed. The processing that corresponds to the position to which the Touch-Down operation has been performed refers to, for example, processing for moving the image 302, etc. arranged in the area other than the page 200 of the electronic album and the image tray 300. Next, in S328, the CPU 101 determines whether a Touch-Up operation has been performed. If the Touch-Up operation has been performed, the processing proceeds to S301, and if not, the processing proceeds to S327. Namely, the processing that corresponds to the position to which the above Touch-Down operation has been performed is repeated until a Touch-Up is performed.

Advantageous Effects of Present Embodiment

As described above, in the case where the user manually designates an image and an area, the electronic album creating apparatus according to the present embodiment arranges (displays) the designated image in the designated area. In addition, the electronic album creating apparatus automatically selects an image and arranges the selected image in the area in which no image is arranged (for example, a frame area other than a frame area in which the user has manually arranged an image) among the areas designated by the user. In this way, it is possible to achieve labor savings and increased efficiency in a user operation for creating the electronic album.

In addition, in the processing for selecting and arranging the image, the electronic album creating apparatus 100 displays the image tray 300 that moves like a wave and also displays an animation in which some of the images are displayed as if the images were popping in the image tray 300. In this way, the user would feel that the electronic album creating apparatus 100 selects and arranges the images in a life-like manner.

Embodiment 2

An electronic album creating apparatus 100 according to a present embodiment will be described with an example in which icons (hereinafter, also referred to as search-condition icons) for specifying image search conditions are provided on a display unit 105. In the present embodiment, the electronic album creating apparatus 100 determines a search condition for selecting an image to be arranged in a frame area on a page 200 of an electronic album based on the above search-condition icons. Functional units, etc. having the same functions as those in Embodiment 1 will be denoted by the same reference characters, and descriptions thereof will be omitted.

Examples of Screen Display

FIGS. 4A to 4D illustrate examples of selection of frame areas and arrangement of images performed by the electronic album creating apparatus 100 according to the present embodiment. In the present embodiment, the electronic album creating apparatus 100 arranges an image that satisfies a search condition specified by a search-condition icon, in a frame area that matches a predetermined condition among a plurality of frame areas on the page 200 of the electronic album. Since a display of the page 200 of the electronic album and an image tray 300 and a display in a case where a Touch-Down has been performed to the page 200 of the electronic album are the same as those in FIGS. 2A and 2B, respectively, descriptions thereof will be omitted.

Figure 4A:
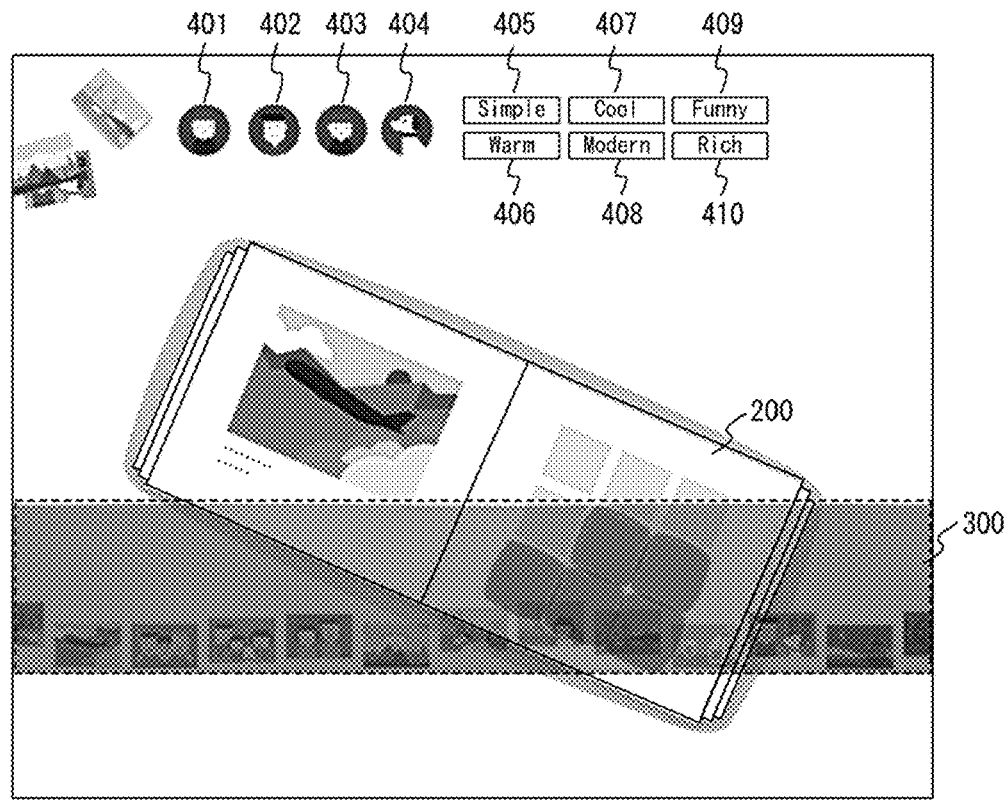
FIG. 4A illustrates an example of a display image according to Embodiment 2.

FIG. 4A illustrates a state in which a part of the page 200 of the electronic album is overlapped with the image tray 300. When the end portion (in FIG. 4A, the right end) of the page 200 of the electronic album reaches the image tray 300, the display area of the image tray 300 expands. The expanded image tray 300 is displayed such that the image tray 300 overlaps frame areas on the page 200 of the electronic album. In addition, when the part of page 200 of the electronic album is overlapped with the image tray 300, the electronic album creating apparatus 100 according to the present embodiment displays search-condition icons 401 to 410 at the upper part of the display unit 105. The timing for displaying the search-condition icons is not limited to the above case. For example, the search-condition icons may be displayed at all times while the page 200 of the electronic album is being displayed.

The search-condition icons 401 to 410 will be described. The search-condition icons 401 to 404 represent specific persons and animals such as a dog. The images displayed as these icons are images of specific persons, etc. extracted from a plurality of images in the image tray 300 in advance. A method for extracting an image of a specific person, etc. from the plurality of images is not particularly limited. An existing pattern recognition technique may be used to recognize a specific person, etc., and the recognized range may be extracted in advance. The search-condition icons 405 to 410 represent color tones. Specifically, the search-condition icons 405 to 410 represent "Simple (low chroma)", "Warm (warm color)", "Cool (cool color)", "Modern (high contrast)", "Funny (high brightness)", and "Rich (high chroma)", respectively. As is the case above, the color tone of the individual image is also extracted per image in advance. The number and kinds of the search-condition icons are not limited to the above examples.

Figure 4B:
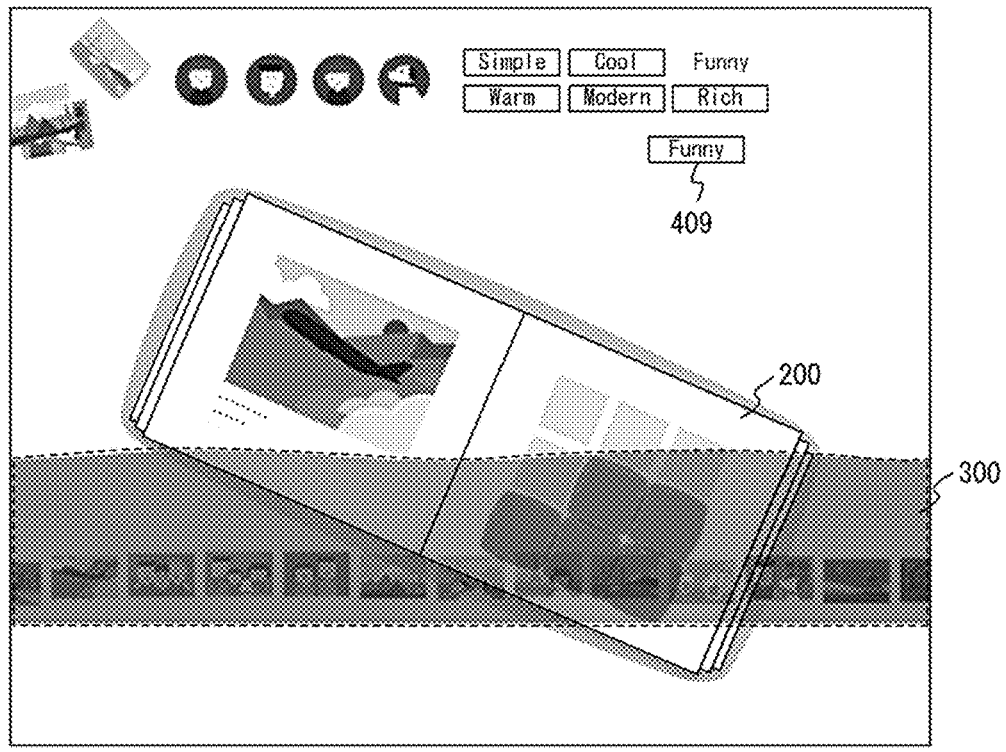
FIG. 4B illustrates an example of a display image according to Embodiment 2.

FIG. 4B illustrates an example of a display in a case where the user has performed a Touch-Down and moved (performed a Touch-Move on) the search-condition icon 409 (Funny). While the Touch-Move is being performed by the user, the search-condition icon 409 is displayed such that the search-condition icon 409 follows the touch point. This is to allow the user to easily identify which search-condition icon has been selected by distinguishably displaying the selected icon. The method for displaying the icons is not particularly limited. For example, the icon following the touch point may be displayed in a semi-transmissive manner. Alternatively, other than the search-condition icon at the original position, a copied icon following the touch point may be displayed.

Figure 4C:
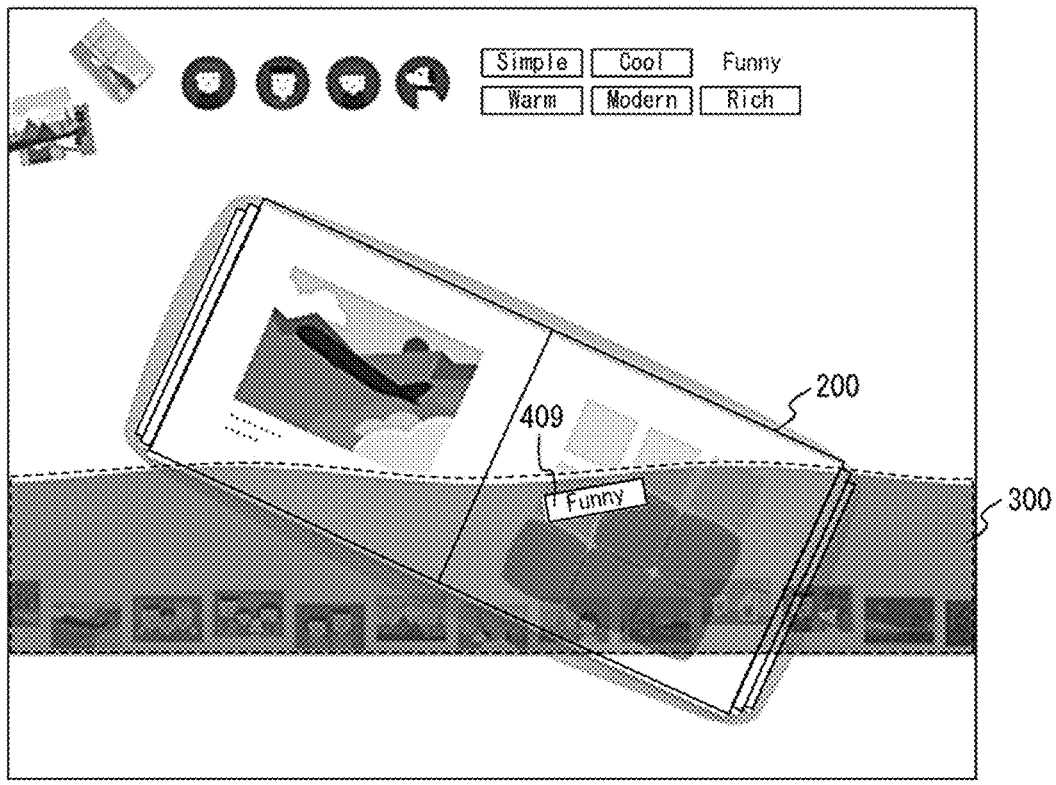
FIG. 4C illustrates an example of a display image according to Embodiment 2.

FIG. 4C illustrates an example of a display in a case where the search-condition icon 409 has been moved to the image tray 300 by a Touch-Move operation by the user, and then a Touch-Up operation has been performed. In the present embodiment, along with an animation that represents the upper end of the image tray 300 moving like a wave, the search-condition icon 409 is displayed such that the search-condition icon 409 is floating in the image tray 300. This is to present the user that an image to be determined by the electronic album creating apparatus 100 is being searched in accordance with the search condition represented by the search-condition icon 409 ("Funny" in the example in FIG. 4C).

Figure 4D:
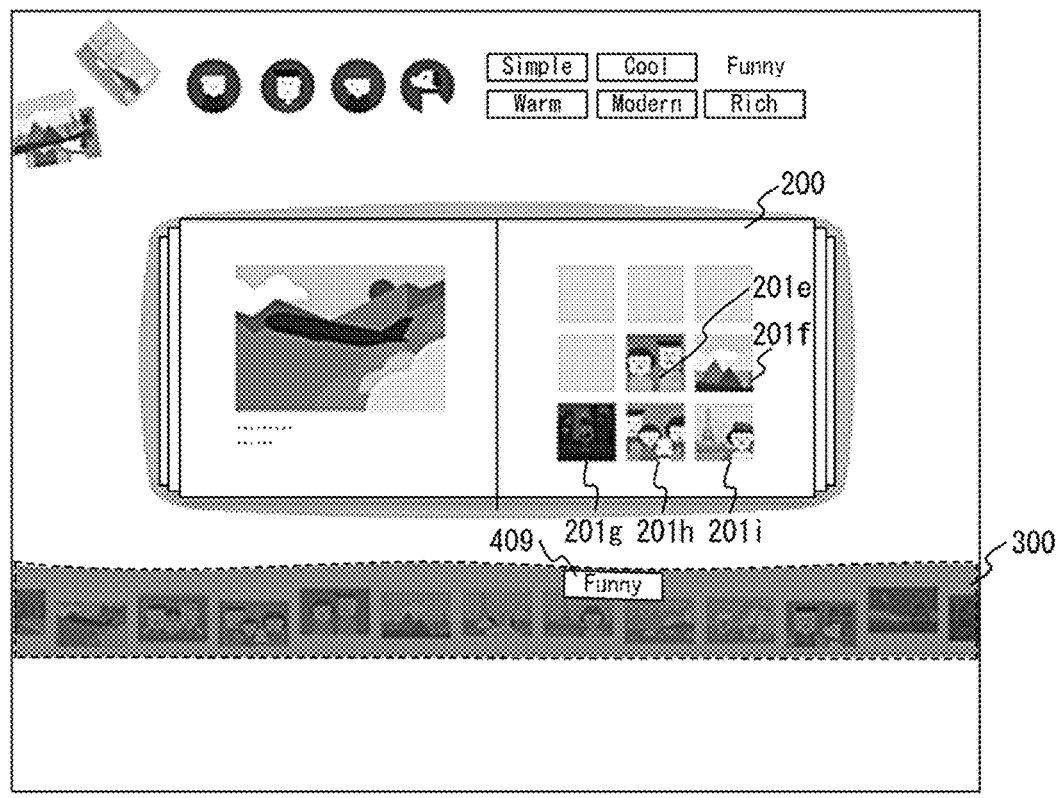
FIG. 4D illustrates an example of a display image according to Embodiment 2.

FIG. 4D illustrates an example of a display in a case where the user ends the touch to the page 200 of the electronic album by performing a Touch-Up operation. In this case, the page 200 of the electronic album is displayed at its original position. At this point, images that have been searched in accordance with the search condition corresponding to the search-condition icon 409 are arranged in frame areas 201e to 201i that are overlapped with the image tray 300 in FIG. 4A. In this way, the image is automatically selected and arranged in the part of the frame area 201 designated by the user.

Processing Contents

Figure 5:
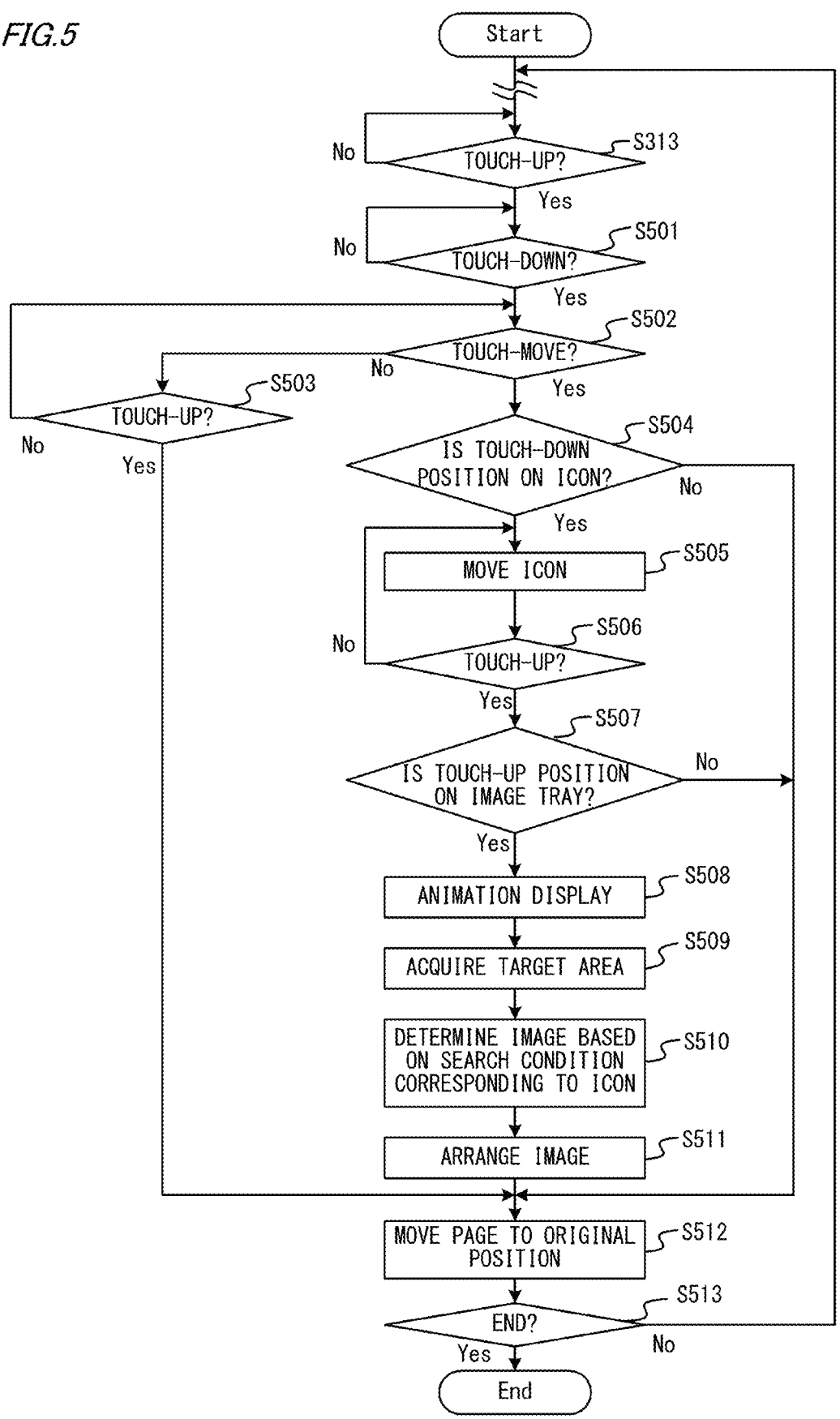
FIG. 5 is a flowchart illustrating an example of processing according to Embodiment 2.

In the present embodiment, the CPU 101 performs processing of steps S301 to S313 and S320 in FIG. 3A, and after performing processing of S313, the CPU 101 performs processing illustrated in a flowchart in FIG. 5.

In the present embodiment, the CPU 101 displays the search-condition icons 401 to 410 on the display unit 105 in advance.

In the present embodiment, when the CPU 101 determines that a Touch-Up operation has been performed in S313, in S501, the CPU 101 determines whether the user has performed a Touch-Down operation again. If the Touch-Down operation has been performed, the processing proceeds to S502, and if not, the CPU 101 repeats the determination in S501. In the present embodiment, the CPU 101 repeats the processing in S313 until the CPU 101 determines that the Touch-Up operation has been performed.

In S502, the CPU 101 determines whether a moving operation (a Touch-Move operation) of a touch point has been performed. If the moving operation of the touch point has been performed, the processing proceeds to S504, and if not, the processing proceeds to S503.

In S503, the CPU 101 determines whether a Touch-Up operation has been performed. If the Touch-Up operation has been performed, the processing proceeds to S512, and if not, the processing proceeds to S502. In S512, the CPU 101 moves the page 200 of the electronic album to its original position and displays the moved page 200 of the electronic album.

In S504, the CPU 101 determines whether a position to which the Touch-Down has been performed is on a search-condition icon. If the Touch-Down position is on the search-condition icon, the processing proceeds to S505, and if not, the processing proceeds to S512.

In S505, the CPU 101 causes the search-condition icon (hereinafter, referred to as a selected icon) to which the Touch-Down has been performed to follow the touch point and displays the search-condition icon following the touch point. This is to allow the user to easily identify which search-condition icon is the selected icon. The method for displaying the selected icon is not particularly limited. For example, the selected icon following the touch point may be displayed in a semi-transmissive manner. Alternatively, other than the search-condition icons displayed at the upper part of the display screen, a copied selected icon following the touch point may be displayed.

In S506, the CPU 101 determines whether a Touch-Up operation has been performed. If the Touch-Up operation has been performed, the processing proceeds to S507, and if not, the CPU 101 repeats the processing in S505.

In S507, the CPU 101 determines whether the Touch-Up position is on the image tray 300. If the Touch-Up position is on the image tray 300, the CPU 101 performs processing in S508 and S509, and if not, the processing proceeds to S512. Since the processing in S508 and S509 is the same as that in S314 and S315 described above, descriptions thereof will be omitted.

In S510, the CPU 101 searches for an image by adding a content corresponding to the selected search-condition icon to the image search condition and determines an image to be arranged in an arrangement target area. Specifically, when the user specifies a search condition by moving a corresponding search-condition icon to the image tray 300, the determination unit 153 determines an image that satisfies the search condition as an image to be arranged in the arrangement target area. In the present embodiment, while the search condition is being specified, the above search-condition icon and the image that satisfies the search condition are displayed in the image tray 300.

In the present embodiment, the CPU 101 exclusively acquires the image that matches the content represented by the selected icon. However, the CPU 101 may preferentially acquire the image that matches the content represented by the selected icon. Namely, the CPU 101 may acquire the image other than the image that matches the content represented by the selected icon. This is effective when the number of the images that satisfy the above search condition is less than the number of the arrangement target areas. Alternatively, in step S510, the CPU 101 may only perform the processing for adding the content represented by the selected search-condition icon to the image search condition, and the CPU 101 may separately perform the processing for displaying the result of the image search and determining the image to be arranged in the arrangement target area from the search result.

In S511, the CPU 101 arranges the image determined above in the arrangement target area. Since this processing is the same as that in step S317, descriptions thereof will be omitted.

In S512, the CPU 101 moves the page 200 of the electronic album to its original position and displays the moved page 200 of the electronic album. In addition, the CPU 101 ends the moving display (display indicating the state of being moved) of the selected icon. Namely, the CPU 101 arranges the selected icon on the position where the Touch-Up has been performed.

In S513, if an end condition is satisfied, the CPU 101 ends the processing. If the end condition is not satisfied, the processing proceeds to S301. Since this processing is the same as that in S319 described above, descriptions thereof will be omitted.

Advantageous Effects of Present Embodiment

As describe above, in the case where the image is automatically selected and arranged in the frame area designated by the user, the image that is searched based on the search condition specified by the user is arranged in the selected frame area. Thus, the electronic album creating apparatus allows the user to create a more preferable electronic album.

Variations

In the embodiments described above, the frame area in which an image is automatically arranged is designated in the electronic album on the frame-area basis. However, the frame area may be designated in the electronic album on a page basis. In this case, an electronic album creating apparatus automatically selects and arranges an image in a frame area that satisfies the above predetermined condition among frame areas included in a designated page.

In Embodiment 2 described above, the page 200 of the electronic album is overlapped with the image tray 300, and then, the search condition is set by moving the search-condition icon. However, the order of the operations is not limited to this example. For example, first, the user moves a search-condition icon to the image tray 300 by performing a Touch-Move operation, and then, the determination unit 153 acquires an image that matches a condition corresponding to the search-condition icon from the images in the image tray 300. At this point, only the images that match the above condition are displayed in the image tray. Next, the page 200 of the electronic album is overlapped with the image tray 300 in this state. Next, the arrangement unit 154 may arrange an image that matches the above condition in an arrangement target area.

Embodiment 3

In Embodiment 3, there is provided an information processing apparatus (electronic album creating apparatus) 100 with which photographs or the like that a user has used in the past can easily be reused. The same configuration as Embodiment 1 will be denoted by the same reference characters, and descriptions thereof will be omitted.

Processing Contents

Figure 6A:
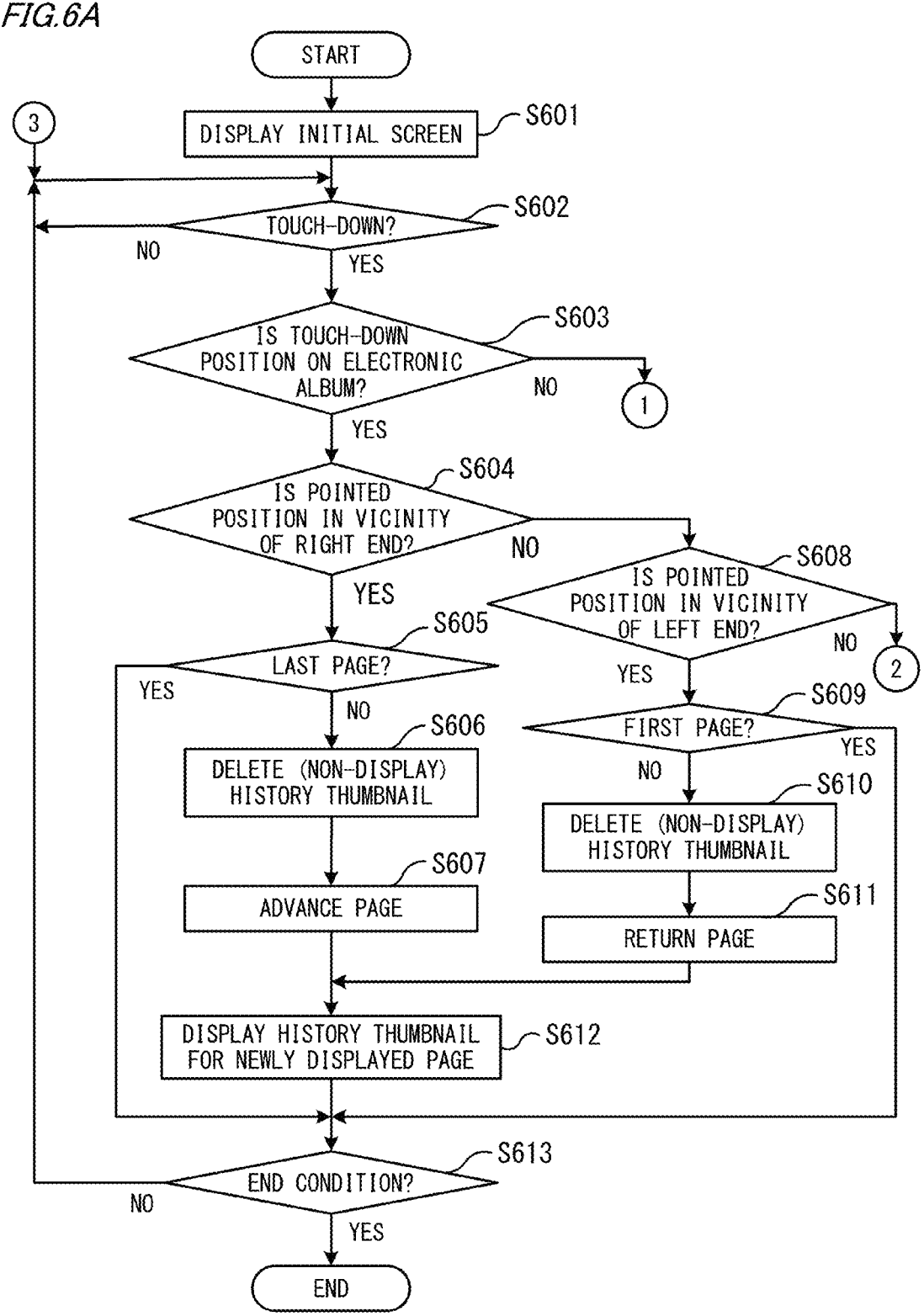
FIG. 6A is a flowchart illustrating an example of processing for displaying a history thumbnail.
Figure 6C:
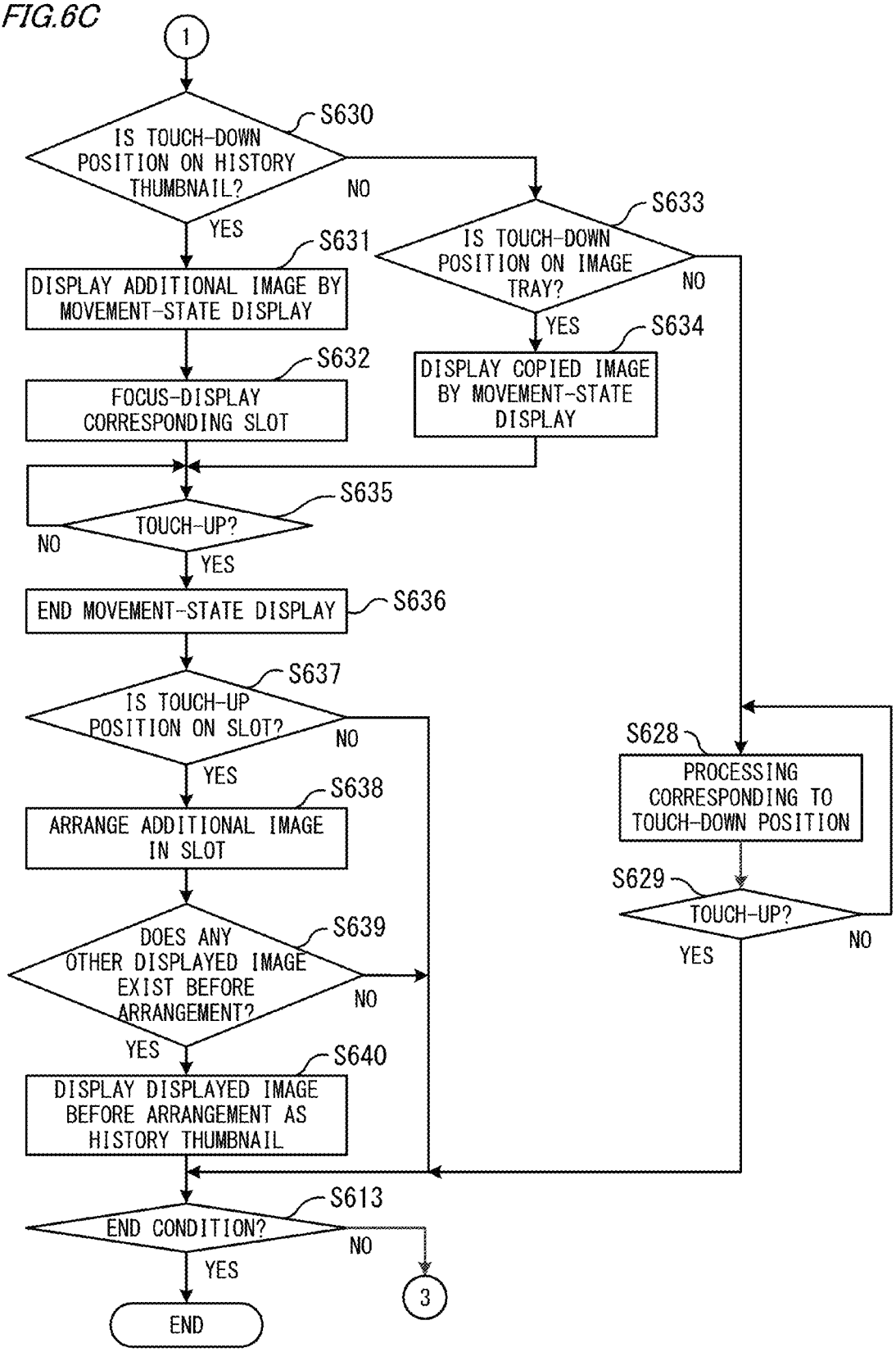
FIG. 6C is a flowchart illustrating an example of processing for adding an image to a page of an electronic album.

FIGS. 6A to 6C illustrate processing for displaying a history thumbnail and processing for adding an image in an electronic album. In the information processing apparatus 100, a CPU 101 displays the electronic album having a plurality of pages on a display (display unit) 105. The CPU 101 displays an animation in which pages of the electronic album are turned (switched) in accordance with an instruction (operation) from a user and changes pages displayed on the display 105. The CPU 101 performs editing such as adding, replacing, deleting, or the like of the images arranged in a page of the electronic album in accordance with an instruction from the user. The CPU 101 stores a thumbnail image (reduced image) of an image that has been replaced by another new image and an image that has been deleted from a page of the electronic album after being added to the page of the electronic album, as a "history thumbnail" in association with the corresponding page. In addition, the CPU 101 displays a replaced or deleted thumbnail image (history thumbnail) on the display 105. An image to be displayed as a history thumbnail is not limited to a photograph, but an image such as text data, an illustration created by the user, a figure, and the like may be displayed. In addition, by adding and deleting a plurality of images in an individual slot on a page of the electronic album, thumbnail images of the plurality of images are associated with the individual slot on the page of the electronic album and stored as history thumbnails.

FIG. 6A is a flowchart illustrating an example of processing for displaying a history thumbnail. FIG. 6A illustrates the history-thumbnail display processing performed when page switching is performed on the electronic album. FIGS. 7A to 7D illustrate screen examples to describe the display processing illustrated in FIG. 6A.

FIG. 6B is a flowchart illustrating an example of processing for displaying a history thumbnail. FIG. 6B illustrates processing for displaying a history thumbnail corresponding to a slot selected by the user. The slot refers to a frame indicating a position at which an image is laid out (arranged) on the electronic album. FIGS. 8A, 8B, 9A, and 9B illustrate screen examples to describe the display processing illustrated in FIG. 6B.

FIG. 6C is a flowchart illustrating an example of processing for adding an image to a page of the electronic album. FIG. 6C describes processing performed when the user arranges a thumbnail image, which is displayed in an image tray or a history area, in a slot. In addition, FIGS. 10A to 10E illustrate screen examples to describe the image addition processing illustrated in FIG. 6C.

First, the history-thumbnail display processing illustrated in FIG. 6A will be described. For example, the history-thumbnail display processing in FIG. 6A is started when the power of the information processing apparatus 100 is turned on or when an electronic album creating application program is started.

In step S601, first, the CPU 101 displays an initial screen for creating an electronic album on the display 105. The initial screen will be described with FIG. 7A.

Figure 7A:
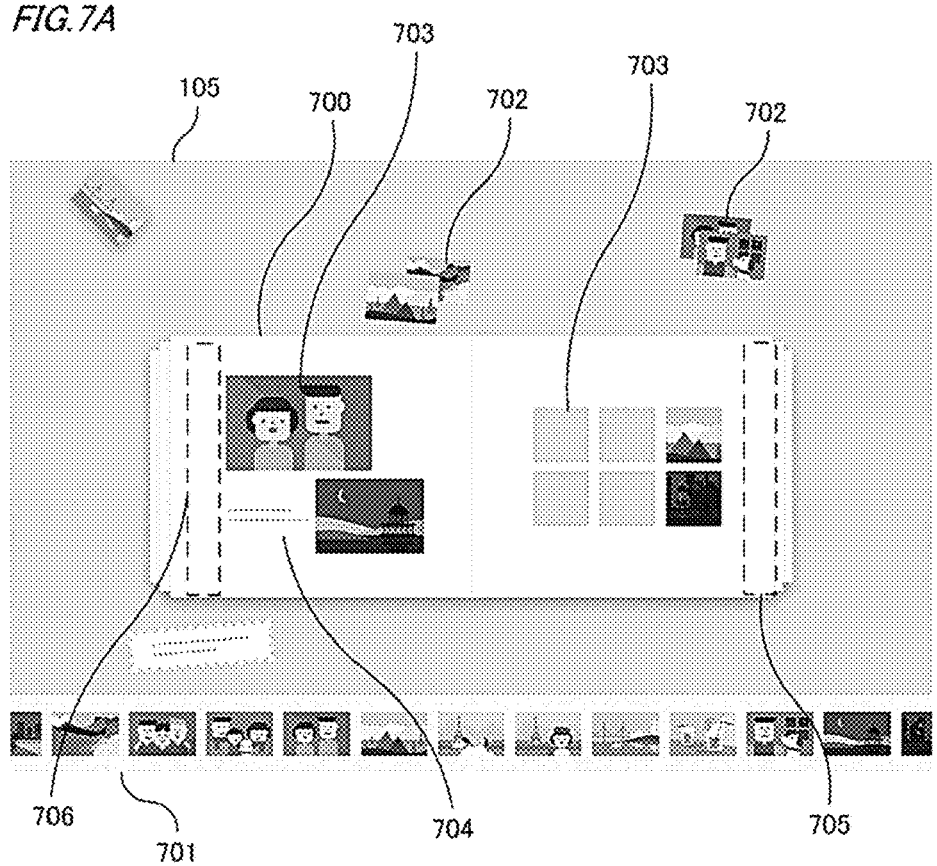
FIG. 7A illustrates an example of an initial screen for editing the electronic album.

FIG. 7A illustrates an example of the initial screen for editing the electronic album. The initial screen displays a page 700 of the electronic album, an image tray 701, a history thumbnail 702, a slot 703, and a textbox 704.

The electronic album has a plurality of pages, and the page 700 displayed on the display 105 is switched in accordance with a user instruction. In FIG. 7A, pages on the right and left sides (a two-page spread) that form a pair when the electronic album is opened are displayed on the display 105. In the image tray 701, a list of thumbnail images (candidate thumbnails) corresponding to a part of or all of the images, which are at least one image that can be arranged on (added to) the page 700 of the electronic album is displayed. If only a part of the candidate thumbnails is displayed in the image tray 701, the user can change the candidate thumbnails to be displayed therein by performing a scroll operation or the like to the image tray 701. The history thumbnail 702 is a thumbnail image displayed as a history, the thumbnail image having been added to or deleted from the page 700 of the electronic album. The user can select and add any of the history thumbnails 702 to the page 700 of the electronic album. Hereinafter, an image selected from the image tray 701 or the history thumbnail 702 and newly added to the page 700 of the electronic album is referred to as an additional image.

Objects displayed on the page 700 of the electronic album is, for example, the slot 703 and the textbox 704. The slot 703 is a frame indicating a position where an image is laid out on the page 700 of the electronic album. The textbox 704 indicates a position where text of a caption on a photograph (a title, description, etc. of a photograph) is laid out. The user can add an image, text, or the like to the slot 703 and the textbox 704 displayed on the page 700 of the electronic album.

The history thumbnail 702 may be rotated by a predetermined angle (for example, ±5°) on the screen of the display 105 and displayed in the "inclined" state. The history thumbnail 702 can give the user a different impression from the candidate thumbnail in the image tray 701 by being displayed in a different manner from the candidate thumbnail displayed in the image tray 701. In this way, the user can easily distinguish the history thumbnail 702 from the candidate thumbnail in the image tray 701.

In step S602, the CPU 101 determines whether the user has performed a Touch-Down operation. If the user has performed the Touch-Down operation (YES in step S602), the processing proceeds to step S603. If the user has not performed the Touch-Down operation (NO in step S602), the determination processing in step S602 is repeated at predetermined intervals.

In step S603, the CPU 101 determines whether a position to which the user has performed the Touch-Down is on the page 700 of the electronic album. If the Touch-Down position is on the page 700 of the electronic album (YES in step S603), the processing proceeds to step S5604. If the Touch-Down position is not on the page 700 of the electronic album (NO in step S603), the processing proceeds to step S630 in FIG. 6C.

In step S604, the CPU 101 determines whether the position pointed at by the user is in the vicinity of the right end of the page 700 of the electronic album when facing the display 105 (an area 705 in FIG. 7A). The position pointed at refers to a position where, after a Touch-Down operation, the user has performed a Touch-Up operation without moving. Alternatively, the position pointed at may refer to a position clicked by a pointing device such as a mouse. If the position pointed at by the user is in the vicinity of the right end (YES in step S604), the processing proceeds to step S605. If the position pointed at by the user is not in the vicinity of the right end (NO in step S604), the processing proceeds to S608.

In step S605, the CPU 101 determines whether the page 700 of the electronic album is the last page. If the displayed page is the last page (YES in step S605), the processing proceeds to step S613. If not (NO in step S605), then in step S606, the CPU 101 deletes the history thumbnail 702 displayed on the display 105 to be non-displayed. Next, the processing proceeds to step S607. In step S607, the CPU 101 performs a page advancing display by switching the page 700 of the electronic album to the next page to be displayed on the display 105.

In step S608, the CPU 101 determines whether the position pointed at by the user on the page 700 of the electronic album is in the vicinity of the left end (an area 706 in FIG. 7A) when facing the display 105. If the position pointed at by the user is in the vicinity of the left end (YES in step S608), the processing proceeds to step S609. If the position pointed at by the user is not in the vicinity of the left end (NO in step S608), the processing proceeds to step S620 in FIG. 6B.

In step S609, the CPU 101 determines whether the page 700 of the electronic album is the first page. If the displayed page is the first page (YES in step S609), the processing proceeds to step S613. If not (NO in step S609), then in step S610, the CPU 101 deletes the history thumbnail 702 displayed on the display 105 to be non-displayed. Next, the processing proceeds to step S611. In step S611, the CPU 101 performs a page returning display by switching the page 700 of the electronic album to the previous page to display the previous page on the display 105.

In step S612, the CPU 101 reads a history thumbnail associated with the page newly displayed by the switching of the page from a recording medium (an external storage medium) 112 and displays the read history thumbnail as the history thumbnail 702.

Figure 7B:
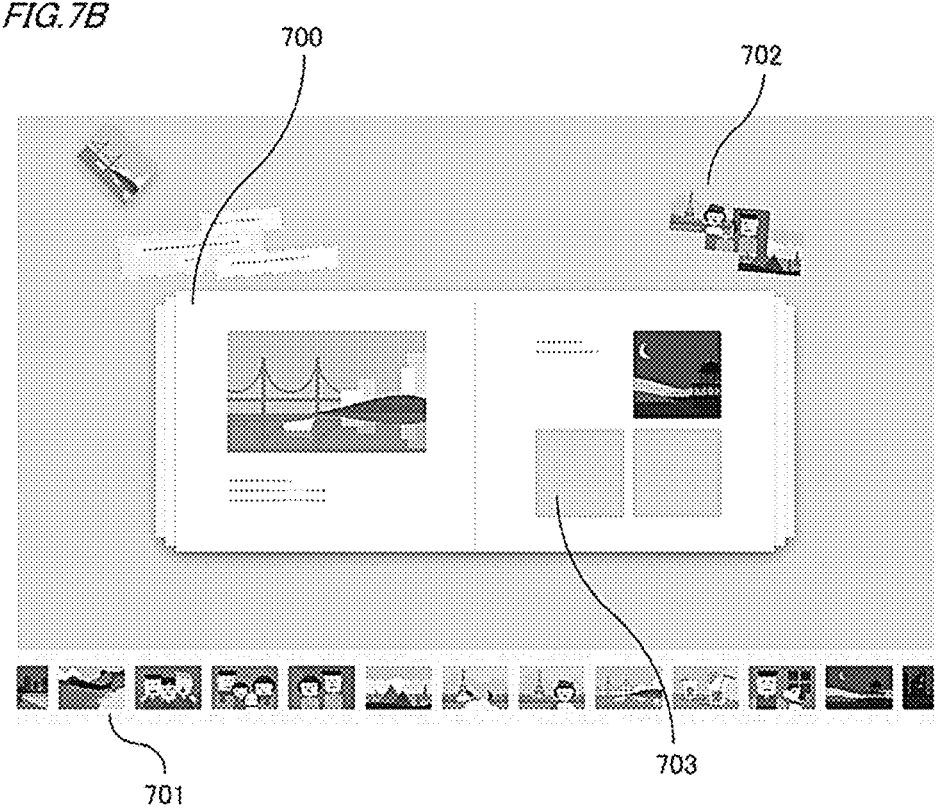
FIG. 7B illustrates an example of a screen displayed by a user operation for turning a page of the electronic album.
Figure 7C:
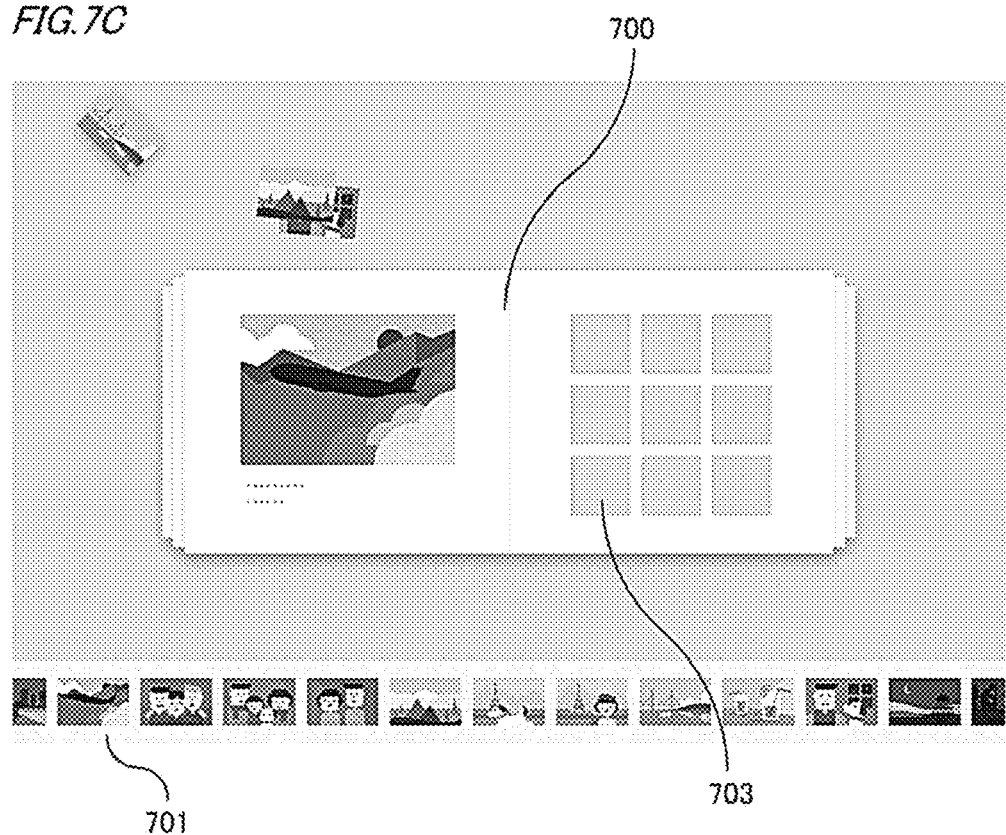
FIG. 7C illustrates an example of a screen displayed by a user operation for turning a page of the electronic album.
Figure 7D:
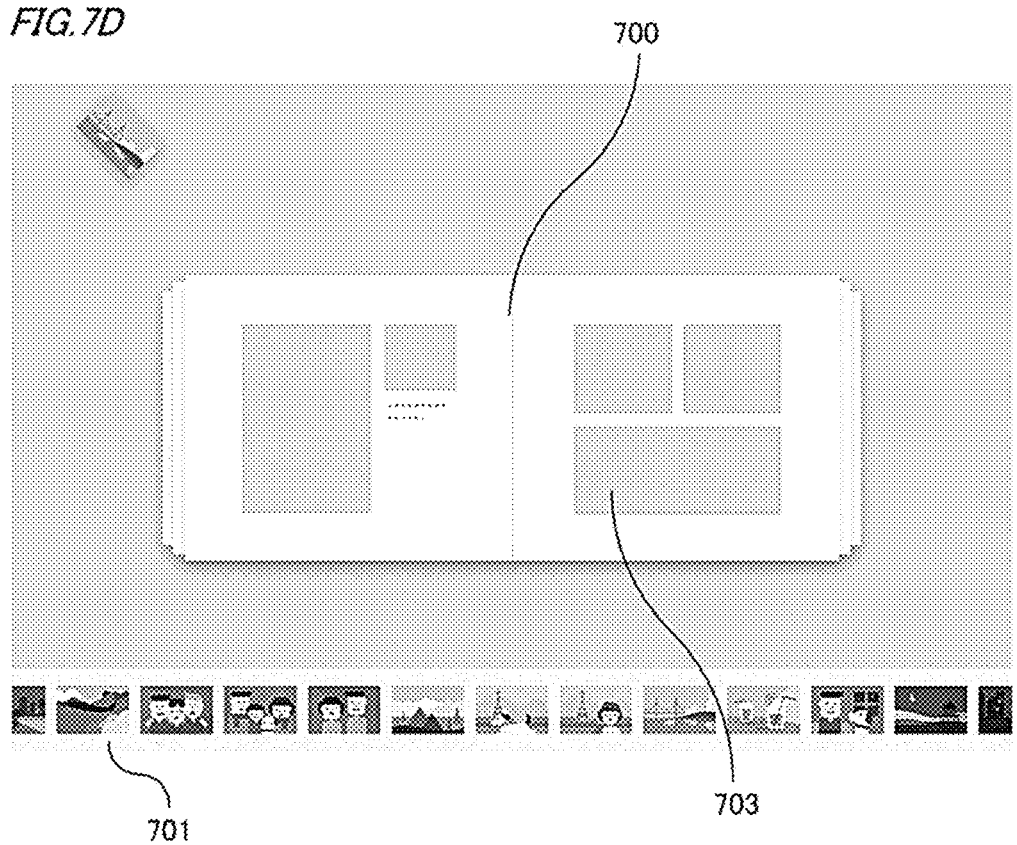
FIG. 7D illustrates an example of a screen displayed by a user operation for turning a page of the electronic album.

Next, screens related to processing from steps S604 to S612 will be described with FIGS. 7B to 7D. FIGS. 7B to 7D illustrate examples of screens displayed by a user operation for switching the page of the electronic album.

When the user performs a Touch-Down operation in the vicinity of the right end or the left end of the page 700 of the electronic album, the initial screen illustrated in FIG. 7A transitions to a screen illustrated in FIG. 7B. On the initial screen in FIG. 7A, for example, the vicinity of the right end is represented by the area 705 surrounded by a dashed line, and the vicinity of the left end is represented by the area 706 surrounded by a dashed line.

On the screen illustrated in FIG. 7B, the history thumbnail 702 that has been displayed on the page 700 of the electronic album on the initial screen in FIG. 7A is not displayed. In addition, on the screen in FIG. 7B, a history thumbnail 702 that corresponds to a page 700 newly displayed by turning the page is displayed. In the screen example in FIG. 7B, the same candidate thumbnails as those on the initial screen in FIG. 7A are displayed in the image tray 701.

Further, when the user performs a Touch-Down operation to the vicinity of the right end or the left end of the page 700 of the electronic album, the page 700 of the electronic album is switched to transition to screens in FIGS. 7C and 7D. In this case, as in the case where the initial screen in FIG. 7A transitions to the screen in FIG. 7B, the history thumbnail 702 that has been displayed before the page switching is not displayed, and a history thumbnail 702 that corresponds to a page newly displayed after the page switching is displayed.

In step S613, the CPU 101 determines whether an end condition of the operation for editing the electronic album is satisfied. The end condition is satisfied, for example, when an instruction to end the electronic album creating application program is received or when a predetermined operation such as turning off the power of the information processing apparatus 100 is received. If the end condition is satisfied (YES in step S613), the processing for displaying the history thumbnail 702 illustrated in FIG. 7A ends. If the end condition is not satisfied (NO in step S613), the processing returns to S602.

Next, processing for displaying the history thumbnail 702 illustrated in FIG. 6B will be described. The history thumbnail display processing in FIG. 6B is performed in a case where, in the processing up to step S608 in FIG. 6A, the CPU 101 determines that the position pointed at by the user on the page 700 of the electronic album is in neither the vicinity of the right end nor the vicinity of the left end.

In step S620, the CPU 101 determines whether the position pointed at by the user is on the slot 703. If the position pointed at by the user is on the slot 703 (YES in step S620), the processing proceeds to step S621. If the position pointed at by the user is not on the slot 703 (NO in step S620), the processing proceeds to step S628.

In step S621, the CPU 101 determines whether the user has performed a Touch-Up operation. If the user has performed the Touch-Up operation (YES in step S621), the processing proceeds to step S622. If the user has not performed the Touch-Up operation (NO in step S621), the determination processing in step S621 is repeated at predetermined intervals.

In step S622, the CPU 101 determines whether an image is already arranged in the slot pointed at by the user. If an image is already arranged in the slot (YES in step S622), the processing proceeds to step S623. If an image is not arranged in the slot (NO in step S622), the processing proceeds to step S625.

In step S623, the CPU 101 detects the overall color tone (hereinafter, referred to as "impression color") of the image arranged in the slot. For example, the CPU 101 analyzes color information about the image, and a color that occupies a larger part of the image is determined to be the impression color of the image.

In step S624, the CPU 101 displays "focus" that surrounds the slot in the impression color of the image arranged in the slot. For example, the focus may be a rim in a ribbon shape surrounding the slot. Displaying the focus rimming around the slot is also referred to as a focus display. The focus display indicates a state in which a GUI object such as an image has been designated or selected by the user. Generally, the focus is displayed in a specific color (hereinafter, referred to as "specific color") regardless of the content of a designated or selected GUI object.

In step S625, since no image is arranged in the slot, the CPU 101 focus-displays the slot using the specific color.

In step S626, the CPU 101 determines whether a history thumbnail corresponding to the slot pointed at by the user is stored. In this step, the history thumbnail refers to a thumbnail image of an image that has been added to or deleted from an object (slot) in the past, and the history thumbnail is managed per object and displayed. If the history thumbnail corresponding to the slot is stored, the history thumbnail is displayed in the vicinity of the corresponding slot. The history thumbnail is displayed to let the user know that the history thumbnail corresponding to the slot exists. If there are a plurality of history thumbnails, the history thumbnails may be displayed in a stacked manner (not in an aligned manner). In this case, the history thumbnails may be displayed in the order of being newly stored as a history, with the latest history thumbnail displayed at the top. If the history thumbnail is stored (YES in step S626), the processing proceeds to step S627. If no history thumbnail is stored (NO in step S626), the processing proceeds to step S613.

In step S627, the CPU 101 displays the history thumbnails that correspond to the slot pointed at by the user in the vicinity of the slot in an aligned manner. For example, when the history thumbnails that have been displayed in a stacked manner are displayed in an aligned manner, the user can recognize that the aligned history thumbnails are the history thumbnails corresponding to the object (slot) pointed at by the user.

In step S628, since the position pointed at by the user is not on the slot 703, the CPU 101 performs processing that corresponds to the Touch-Down position. In step S629, the CPU 101 determines whether the user has performed a Touch-Up operation. If the user has performed the Touch-up operation (YES in step S629), the processing proceeds to step S613. If the user has not performed the Touch-up operation (NO in step S629), the determination processing in step S629 is repeated at predetermined intervals. Since the processing after step S613 in FIG. 6B is the same as that in FIG. 6A, descriptions thereof will be omitted.

Figure 8A:
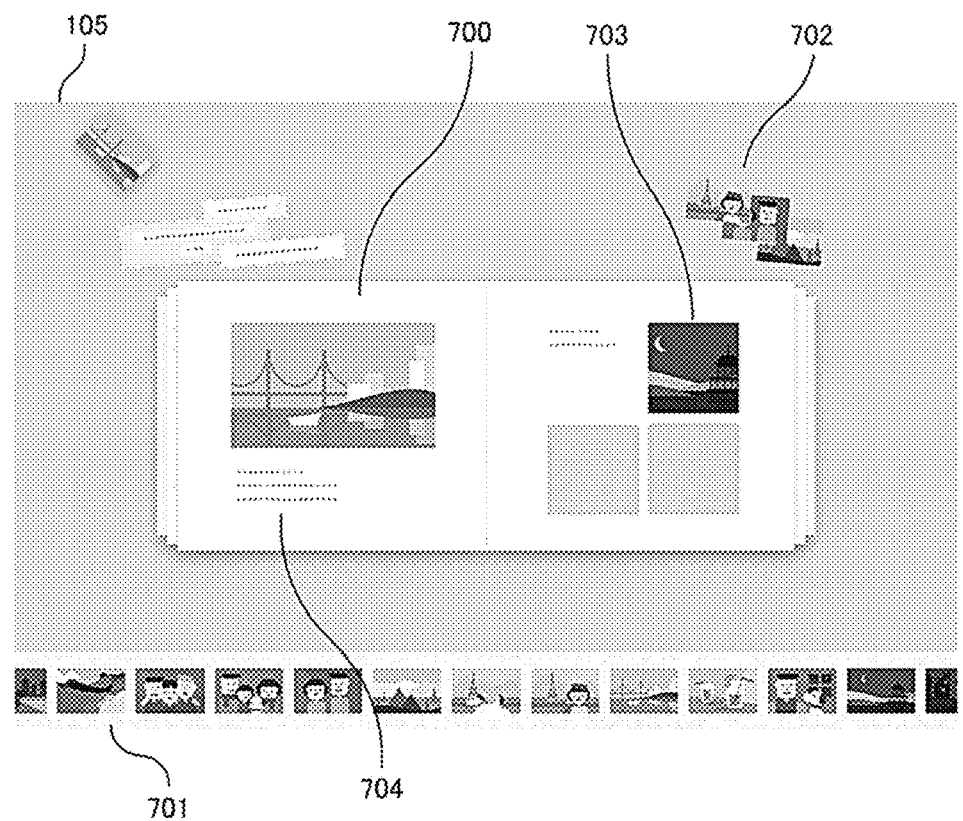
FIG. 8A illustrates an example of a screen on which a history thumbnail corresponding to a slot is displayed.
Figure 8B:
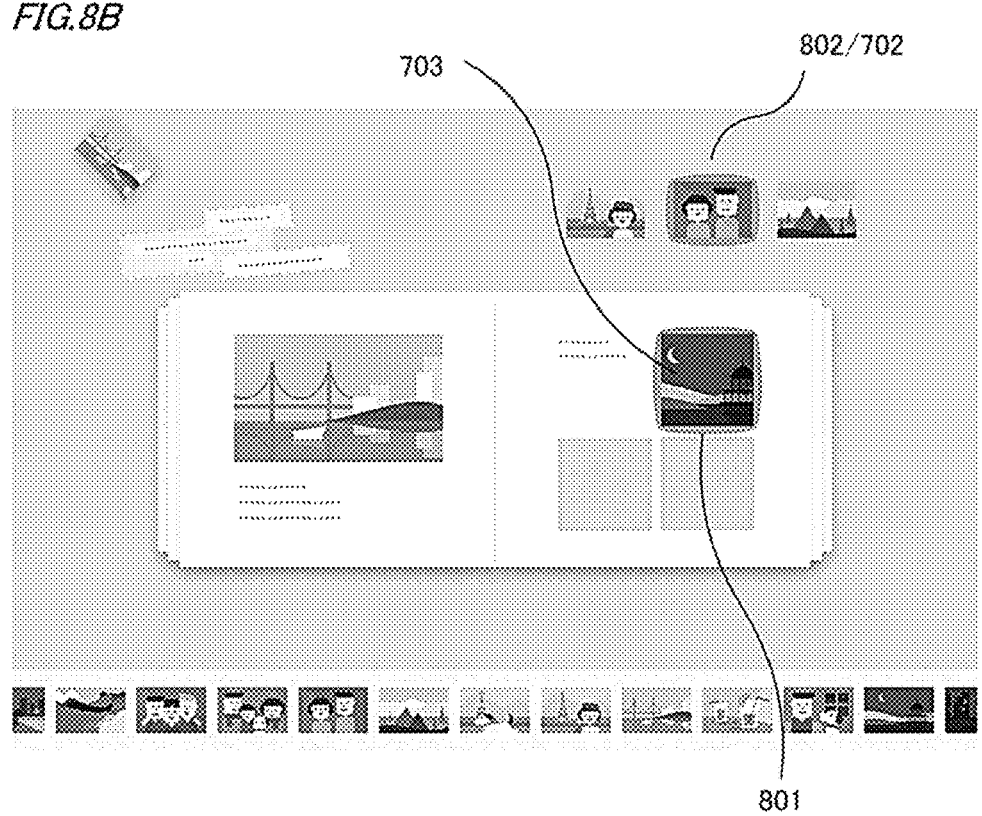
FIG. 8B illustrates an example of a screen on which the history thumbnail corresponding to the slot is displayed.

Next, screens related to the processing from step S620 to step S627 will be described with FIGS. 8A and 8B. FIGS. 8A and 8B illustrate examples of screens on which the history thumbnails corresponding to the slot are displayed.

FIG. 8A is an example of a screen displayed on the display 105 for editing the electronic album. On the screen illustrated in FIG. 8A, the page 700 of the electronic album, the image tray 701, the history thumbnail 702, the slot 703, and the textbox 704 are displayed. On the screen in FIG. 8A, no specific slot is pointed at by the user, and the photographs included in the history thumbnails 702 are displayed in a stack.

If the user points (performs a Touch-Down operation and a Touch-Up operation) at the slot 703 in FIG. 8A, the screen transitions to FIG. 8B. In FIG. 8B, focus 801 is displayed with the slot 703. The focus 801 is displayed such that the focus 801 forms a rim around the slot 703 pointed at by the user, and the focus 801 can be displayed in an impression color of the image arranged. In addition, history thumbnails 802 (702) that correspond to the slot 703 are displayed in the vicinity of the slot 703 in an aligned manner. In this case, the history thumbnails 802 may be displayed in the order of being newly registered as a history, starting from the left side in an aligned manner.

Figure 9A:
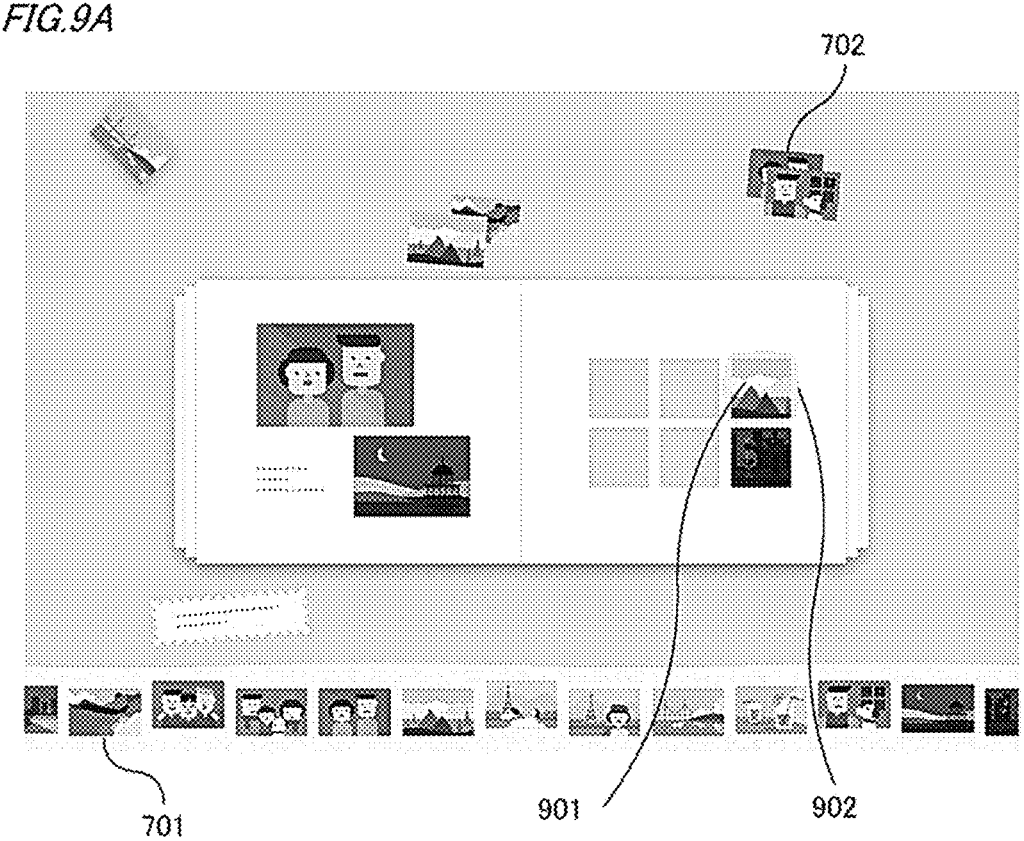
FIG. 9A illustrates an example of a screen on which focus and a state of an image tray are displayed.
Figure 9B:
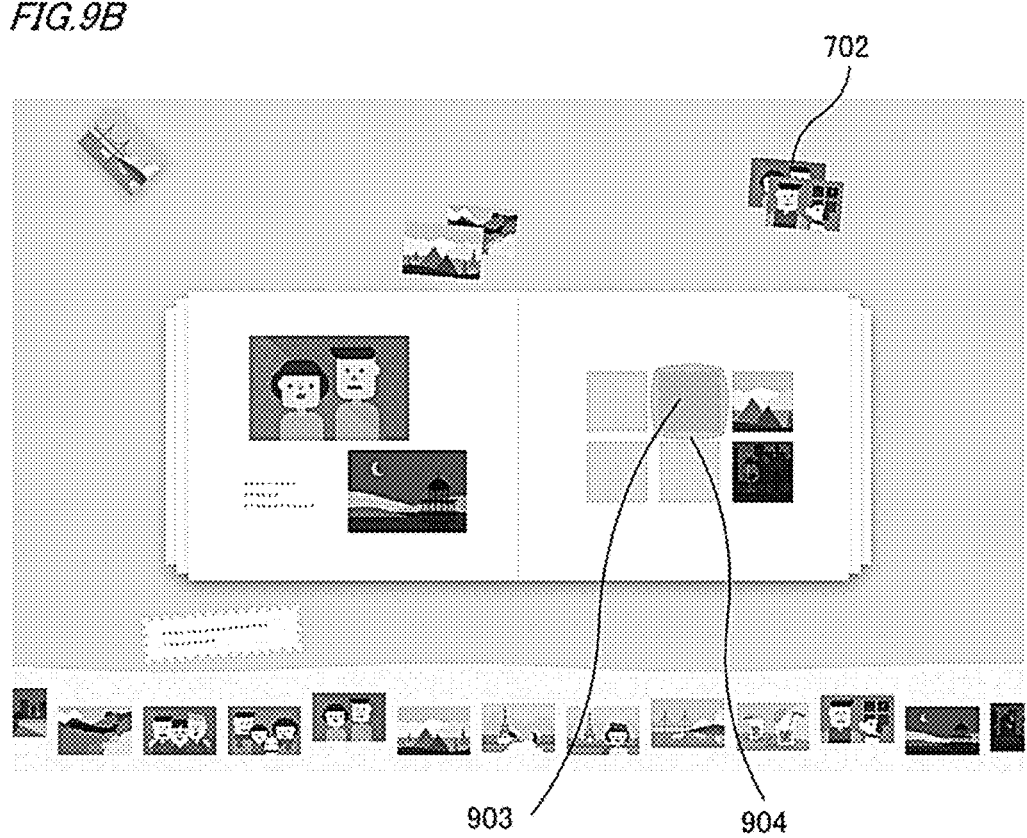
FIG. 9B illustrates an example of a screen on which focus and a state of the image tray are displayed.

Focus displays (steps S624 and S625) performed when the user has pointed at a slot and states of the image tray 701 will be described with FIGS. 9A and 9B. FIGS. 9A and 9B illustrate examples of screens on each of which focus and a state of the image tray 701 are displayed.

FIG. 9A illustrates a state where the user has pointed at (selected) a slot 901 in which an image is already arranged. In FIG. 9A, focus 902 in an impression color (an overall color tone of the arranged image) is displayed with the slot 901.

In addition, the photographs in the image tray 701 may be displayed in an animation in which a display position of the individual photograph moves up and down based on a recommendation degree of the photograph. For example, in FIG. 9A, the third, seventh, and eleventh photographs (images) from the left in the image tray 701 are displayed at a higher position (toward the side of the page 700 of the electronic album) than the other photographs as recommended images for the slot 901.

The information processing apparatus 100 calculates or determines the recommendation degree. For example, the information processing apparatus 100 can calculate a value of the recommendation degree of each of the photographs in the image tray 701 based on attribute information about the photograph arranged in the pointed slot. For example, the attribute information includes a photographing date and time, a color tone, and information about a subject (person, scenery). The information processing apparatus 100 can calculate the recommendation degree by scoring the matching degree of attribute information between the photograph arranged in the slot and each of the photographs in the image tray 701. In addition, if there is no photograph arranged in the slot, the information processing apparatus 100 may determine the recommendation degree of each of the photographs in the image tray 701 based on attribute information about a photograph arranged in a slot near the selected slot.

The information processing apparatus 100 can cause the display position of the individual photograph in the image tray 701 to move up and down based on the calculated recommendation degree of the photograph. The method for notifying the user of the recommendation degree is not limited to the method of vertically changing the display position. For example, the information processing apparatus 100 may rearrange the photographs in the image tray 710 in the order of recommendation degree. As described above, by changing the display position of the individual photograph in the image tray 701 based on the recommendation degree, the information processing apparatus 100 can notify the user of the recommendation degree of each of the photographs. In this way, the user can easily grasp the recommendation degree of each of the photographs. In addition, since the user can select the photograph based on the recommendation degree of each of the photograph, the user can edit a preferred album.

FIG. 9B illustrates a state where the user has pointed at a slot 903 in which no image is arranged. In FIG. 9B, focus 904 displayed with the slot 903 is not in an impression color but in a predetermined specific color.

Next, the processing for adding an image to the electronic album illustrated in FIG. 6C will be described. The image addition processing in FIG. 6C is performed when the CPU 101 determines that the position to which the user has performed the Touch-Down is not on the page 700 of the electronic album, in the processing in step S603 in FIG. 6A.

In step S630, the CPU 101 determines whether the position to which the user has performed the Touch-Down is not on an image of the history thumbnail 702. If the Touch-Down position is on the image of the history thumbnail 702 (YES in step S630), the processing proceeds to step S631. If the Touch-Down position is not on the image of the history thumbnail 702 (NO in step S630), the processing proceeds to step S633.

In step S631, the CPU 101 displays the image (additional image) of the history thumbnail to which the Touch-Down operation is determined to have been performed in S630 by using a "movement-state display", which indicates a state of being moved, for example, by displaying the image (additional image) in a translucent manner. In step S632, the CPU 101 focus-displays the slot that corresponds to the history thumbnail to which the Touch-Down operation has been performed.

In step S633, the CPU 101 determines whether the position to which the user has performed the Touch-Down is on the image in the image tray 701. If the Touch-Down position is on the image in the image tray 701 (YES in step S633), the processing proceeds to step S634. If the Touch-Down position is not on the image in the image tray 701 (NO in step S633), the processing proceeds to step S628.

In step S634, the CPU 101 displays the image in the image tray 701 to which the Touch-Down operation is determined to have been performed in S633 by using a "movement-state display", which indicates a state of being moved, for example, by displaying the image in a translucent manner.

In step S635, the CPU 101 determines whether the user has performed a Touch-Up operation. If the Touch-Up operation has been performed (YES in step S635), the processing proceeds to step S636. If the Touch-Up operation has not been performed (NO in step S635), the determination processing in step S635 is repeated at predetermined intervals.

In step S636, the CPU 101 ends the movement-state display (the display indicating the state of being moved) of the additional image.

In step S637, the CPU 101 determines whether the position where the Touch-Up operation has been performed is on a slot on the page 700 of the electronic album. If the position where the Touch-Up operation has been performed is on a slot on the page 700 of the electronic album (YES in step S637), the processing proceeds to step S638. If the position where the Touch-Up operation has been performed is not on a slot on the page 700 of the electronic album (NO in step S637), the processing proceeds to step S613.

In step S638, the CPU 101 arranges the additional image in the slot where the Touch-Up has been performed.

In step S639, the CPU 101 determines whether any other image has been arranged before the arrangement of the additional image in the slot where the Touch-Up has been performed. If any other image has been arranged before the arrangement of the additional image (YES in step S639), the processing proceeds to step S640. If no other image has been arranged before the arrangement of the additional image (NO in step S639), the processing proceeds to step S613.

In step S640, the CPU 101 displays, as a history thumbnail 702, a thumbnail of the previously displayed image in the slot where the Touch-Up has been performed before the arrangement of the additional image. The thumbnail of the image is displayed in the vicinity of the slot at the outside of the page 700 of the electronic album. In addition, the previously displayed image before the arrangement of the additional image is stored in a recording medium 112 as a history corresponding to the slot, together with identification information about the page including the slot, identification about the slot, and information about a date and time at which the image has been stored as a history. The date and time at which the image has been stored as a history refers to a date and time at which the previously displayed image before the arrangement of the additional image has been replaced by the additional image or deleted. An upper limit may be set for the number of histories stored per page, and when the upper limit is reached, the histories may be deleted from the recording medium 112 in the order from the history having the oldest editing date and time. In addition, the histories arranged in the same slot may be displayed in a stack in the order of editing date and time, with the latest history displayed at the top.

In step S628, since the position of the Touch-Down by the user is not included in any of the page 700 of the electronic album, the history thumbnail 702, or the image tray 701, the CPU 101 performs processing that corresponds to the position where the Touch-Down has been performed. Processing in steps S628 and S629 in FIG. 6C is the same as that in steps S628 and S629 in FIG. 6B. In addition, since processing after step S613 in FIG. 6C is the same as that in FIG. 6A, descriptions thereof will be omitted.

Next, screens related to processing from step S630 to step S640 will be described with FIGS. 10A to 10E. FIGS. 10A to 10E illustrate examples of screens displayed by the user operation for arranging an additional image to a slot.

Figure 10A:
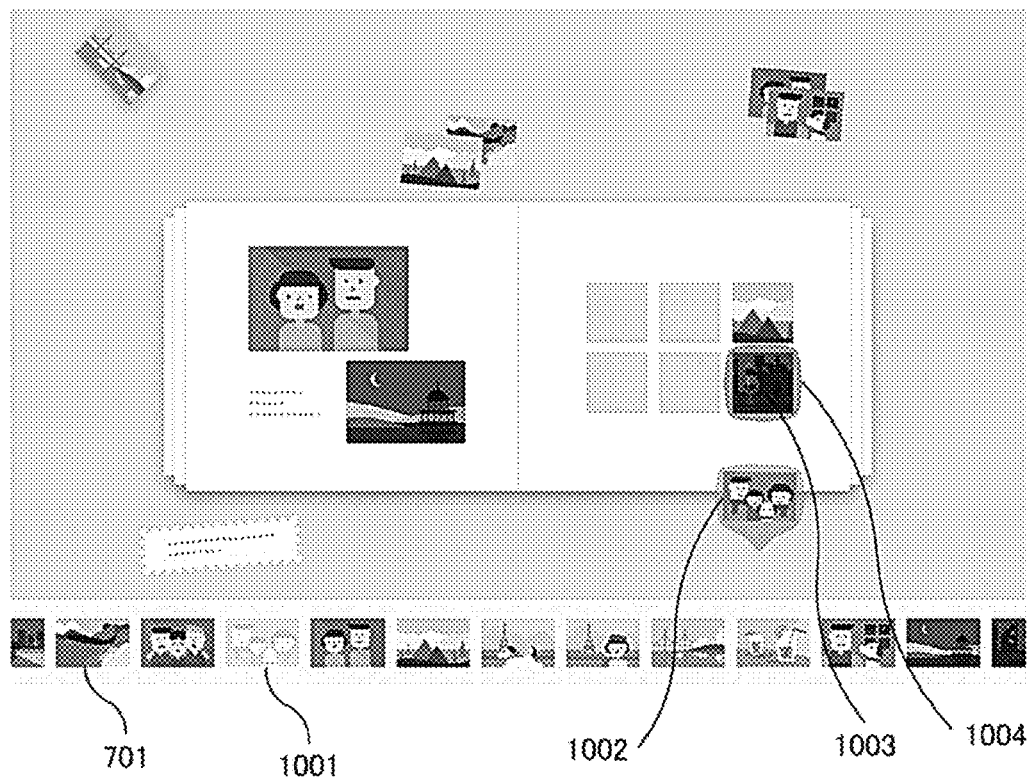
FIG. 10A illustrates an example of a screen displayed by a user operation for arranging an additional image in a slot.

FIG. 10A illustrates a state in which a Touch-Down operation has been performed on an image 1001 in the image tray 701, and the image 1001 is being moved to be added to the page 700 of the electronic album. The image 1001 to be added to the page 700 of the electronic album is displayed in the image tray 701 in a translucent manner. FIG. 10A also illustrates a state in which an additional image 1002, which is a copy of the image 1001, is being moved onto the page 700 of the electronic album by the user operation.

In addition, the additional image 1002 is focus-displayed while being moved onto the page 700 of the electronic album. The additional image 1002 is moved (Touch-Moved) toward a slot 1003 while the Touch-Down being performed. The focus of the additional image 1002 may be in an impression color or a specific color indicating that the additional image 1002 is being moved. In addition, in the slot 1003 which is located the closest to the position where the Touch-Down is being performed by the user, a focus 1004 is displayed in an impression color of the image already arranged.

Figure 10B:
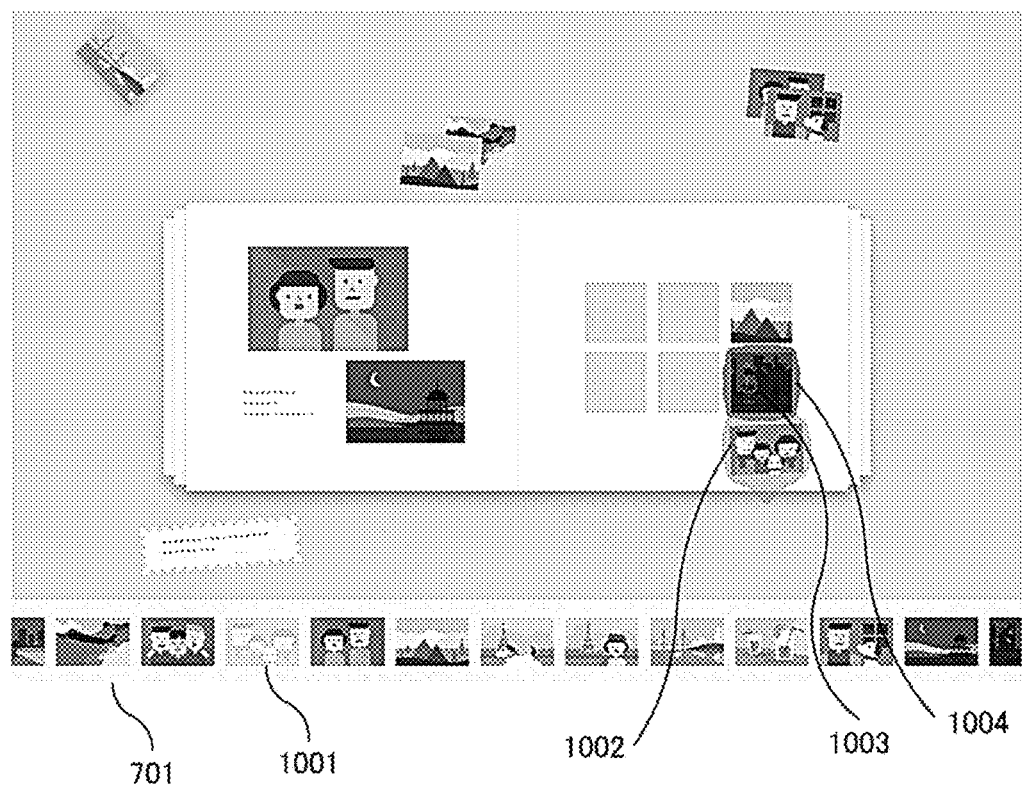
FIG. 10B illustrates an example of a screen displayed by a user operation for arranging the additional image in the slot.

When the Touch-Down position by the user comes closer to the slot 1003 and the additional image 1002 moved by the Touch-Move is moved to the vicinity of the slot 1003, the screen transitions to a state in FIG. 10B. In FIG. 10B, when the additional image 1002 is moved to the vicinity of the slot 1003, an animation in which a line surrounding the focus 1004 moves like a wave is displayed. This animation display allows the user to recognize that the image arranged in the slot 1003 is about to be replaced by the additional image 1002.

Figure 10C:
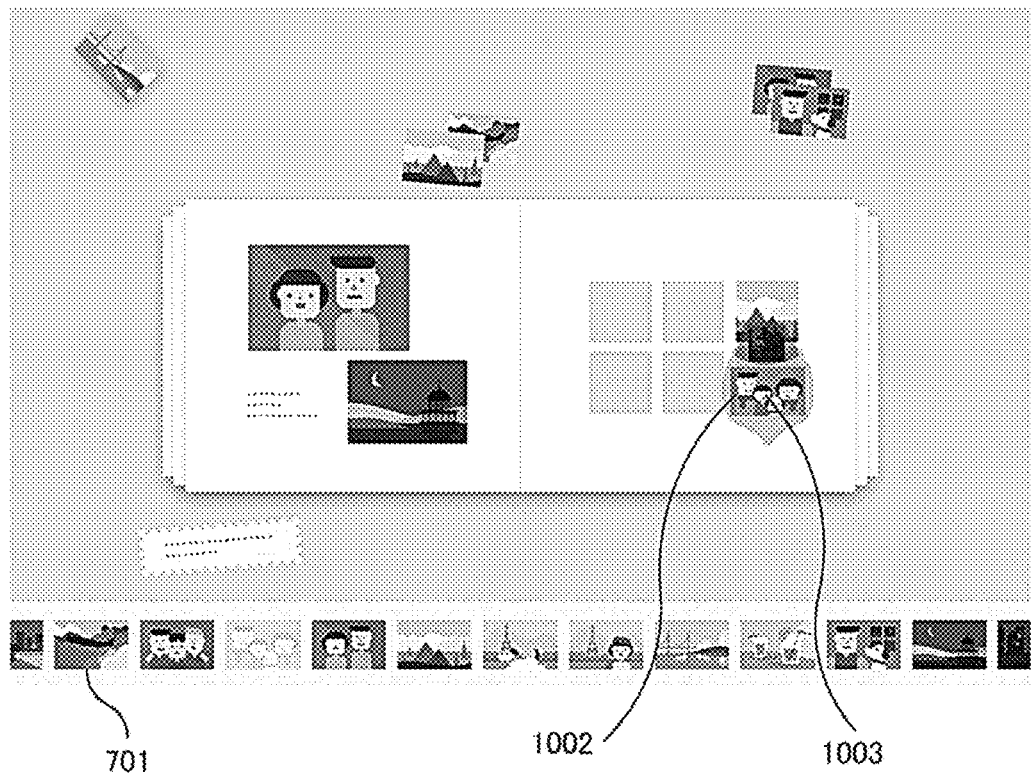
FIG. 10C illustrates an example of a screen displayed by a user operation for arranging the additional image in the slot.
Figure 10D:
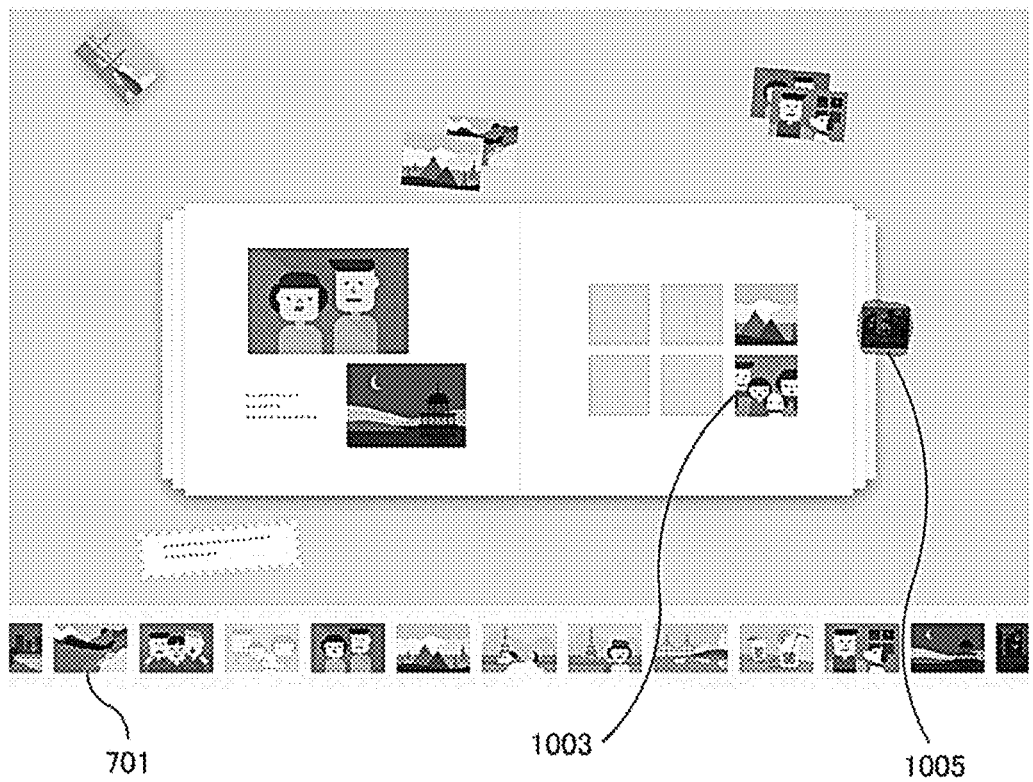
FIG. 10D illustrates an example of a screen displayed by a user operation for arranging the additional image in the slot.
Figure 10E:
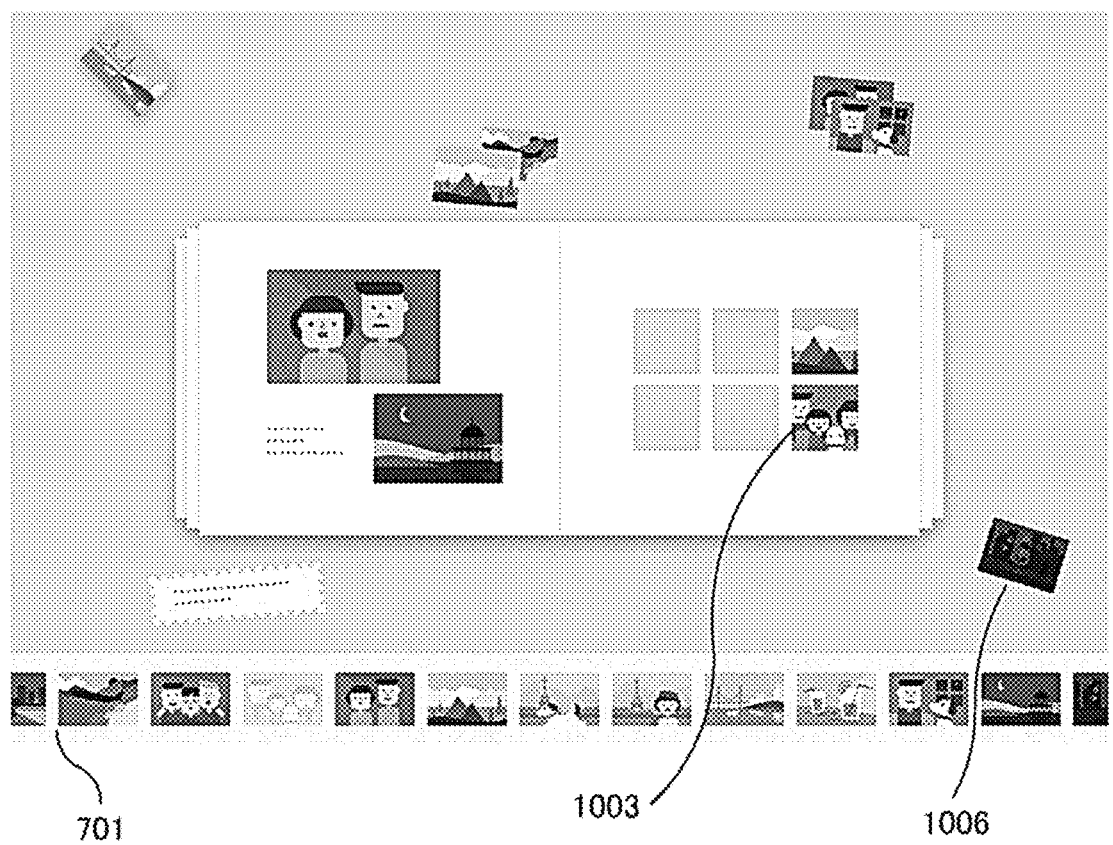
FIG. 10E illustrates an example of a screen displayed by a user operation for arranging the additional image in the slot.

When the Touch-Down position by the user is moved onto the slot 1003, the screen transitions to FIG. 10D via FIG. 10C.

In FIG. 10D, an animation in which a thumbnail 1005 of the image that has been arranged in the slot 1003 is pushed out of the slot 1003 is displayed. The screen transitions to FIG. 10E. The thumbnail 1005 of the image that has been arranged in the slot 1003 is rotated on the screen by a predetermined angle and displayed as a history thumbnail 1006 in the vicinity of the slot 1003.

While the present invention has thus been described based on the preferred embodiments, the present invention is not limited to these specific embodiments, and the present invention includes various modes without departing from the scope of the gist of the present invention. The embodiments described above are each merely an embodiment of the present invention and can appropriately be combined with each other.

While the above embodiments have described examples in which the electronic album creating apparatus of the present invention is applied to a personal computer, the invention is not limited to this example. The present invention is also applicable to an apparatus including a display screen. Namely, the present invention is applicable to a PDA, a mobile phone terminal, a portable image viewer, a printer including a display, a digital photo frame, a music player, a game machine, and an electronic book reader. In addition, the present invention is applicable to a tablet terminal, a smartphone, a home electric appliance and an on-vehicle device including a display, or the like.

According to the present invention, the user can easily create a desired electronic album by reducing the trouble of an operation. In addition, according to the present invention, the user can easily reuse photographs or the like that the user used in the past.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-048668, filed on Mar. 15, 2019 and Japanese Patent Application No. 2019-051380, filed on Mar. 19, 2019, which are hereby incorporated by reference herein in their entirety.

What is claimed is:

1. An information processing apparatus comprising:
a processor; and
a memory storing a program that, when executed by the processor, causes the information processing apparatus to:
(1) display on a screen (a) an electronic photo album where a plurality of frame areas are arranged and (b) a predetermined area where a plurality of images are displayed;
(2) move the electronic photo album such that a position of the electronic photo album on the screen changes and a part of the electronic photo album is overlapped over the predetermined area in accordance with a first user operation;
(3) automatically determine among the plurality of images, based on a predetermined condition, an image to be inserted into a frame area arranged in the part of the electronic photo album that is overlapped over the predetermined area, the frame area being among the plurality of frame areas; and
(4) insert the automatically determined image into the frame area arranged in the part of the electronic photo album that is overlapped over the predetermined area.

2. The information processing apparatus according to claim 1, wherein the program, when executed by the processor, further causes the information processing apparatus to determine an image to be arranged in the electronic photo album in accordance with a second user operation, and
wherein the frame area into which the automatically determined image is inserted is a frame area into which the image determined in accordance with the second user operation is not inserted.

3. The information processing apparatus according to claim 1, wherein the program, when executed by the processor, further causes the information processing apparatus to determine an image to be inserted into the electronic photo album in accordance with a second user operation,
wherein the frame area into which the automatically determined image is inserted is a frame area into which the image determined in accordance with the second user operation is already inserted, and
wherein a date and time at which the already inserted image has been inserted into the frame area is a predetermined date and time or earlier.

4. The information processing apparatus according to claim 1, wherein the electronic photo album is a rectangular area.

5. The information processing apparatus according to claim 1, wherein the program, when executed by the processor, further causes the information processing apparatus to detect a touch operation to a touch-sensitive surface,
wherein the electronic photo album and the predetermined area are displayed on the touch-sensitive surface, and
wherein the first user operation is an operation in which, after a Touch-Down is performed to the touch-sensitive surface, a position being touched is moved.

6. The information processing apparatus according to claim 1, wherein the program, when executed by the processor, further causes the information processing apparatus to display, in the predetermined area, a candidate image that is insertable in a frame area of the plurality of frame areas.

7. The information processing apparatus according to claim 1, wherein the program, when executed by the processor, further causes the information processing apparatus to set a search condition, and
wherein an image that satisfies the search condition is automatically determined as the image to be inserted into the frame area arranged in the part of the electronic photo album which is overlapped over the predetermined area.

8. The information processing apparatus according to claim 7, wherein the program, when executed by the processor, further causes the information processing apparatus to display an icon that corresponds to the search condition, and
wherein the search condition is set based on an icon selected in accordance with a third user operation.

9. The information processing apparatus according to claim 8, wherein the program, when executed by the processor, further causes the information processing apparatus to distinguishably display (a) the icon selected in accordance with the third user operation and (b) an image that satisfies a search condition corresponding to the selected icon.

10. The information processing apparatus according to the claim 1, wherein the program, when executed by the processor, further causes the information processing apparatus to display animation of the predetermined area while the first user operation continues, and
wherein the automatically determined image is inserted into the frame area arranged in the part of the electronic photo album which is overlapped over the predetermined area upon completion of the first user operation.

11. The information processing apparatus according to the claim 1, wherein the electronic photo album is moved from a predetermined position in accordance with the first user operation, and
wherein the program, when executed by the processor, further causes the information processing apparatus to return the electronic photo album to the predetermined position after inserting the automatically determined image into the frame area arranged in the part of the electronic photo album which is overlapped over the predetermined area.

12. A control method of an information processing apparatus, the control method comprising:
displaying on a screen (a) an electronic photo album where a plurality of frame areas are arranged and (b) a predetermined area where a plurality of images are displayed;
moving the electronic photo album such that a position of the electronic photo album on the screen changes and a part of the electronic photo album is overlapped over the predetermined area in accordance with a first user operation;
automatically determining among the plurality of images, based on a predetermined condition, an image to be inserted into a frame area arranged in the part of the electronic photo album that is overlapped over the predetermined area, the frame area being among the plurality of frame areas; and
inserting the automatically determined image into the frame area arranged in the part of the electronic photo album that is overlapped over the predetermined area.

13. A non-transitory computer-readable medium that stores a program, wherein the program causes a computer to execute a method comprising:
displaying on a screen (a) an electronic photo album where a plurality of frame areas are arranged and (b) a predetermined area where a plurality of images are displayed;
moving the electronic photo album such that a position of the electronic photo album on the screen changes and a part of the electronic photo album is overlapped over the predetermined area in accordance with a first user operation;

automatically determining among the plurality of images, based on a predetermined condition, an image to be inserted into a frame area arranged in the part of the electronic photo album that is overlapped over the predetermined area, the frame area being among the plurality of frame areas; and inserting the automatically determined image into the frame area arranged in the part of the electronic photo album that is overlapped over the predetermined area.

* * * * *